(12) United States Patent
Chang et al.

(10) Patent No.: US 6,342,467 B1
(45) Date of Patent: Jan. 29, 2002

(54) METHOD AND COMPOSITION FOR CONTROLLING FLUID LOSS IN HIGH PERMEABILITY HYDROCARBON BEARING FORMATIONS

(75) Inventors: Frank F. Chang, Sugar Land, TX (US); Mehmet Parlar, Broussard, LA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 09/704,974

(22) Filed: Nov. 2, 2000

Related U.S. Application Data

(60) Continuation of application No. 09/324,291, filed on Jun. 2, 1999, now Pat. No. 6,165,947, which is a division of application No. 08/864,269, filed on May 28, 1997, now Pat. No. 5,981,447.

(51) Int. Cl.[7] ................................................. C09K 7/02
(52) U.S. Cl. .................. 507/110; 507/112; 507/114; 507/209; 507/211; 507/214; 507/216; 507/269; 507/271; 507/903; 536/121; 536/80
(58) Field of Search .................. 536/121, 80; 507/110, 507/112, 114, 209, 211, 214, 216, 269, 271, 903

(56) References Cited

U.S. PATENT DOCUMENTS

| | | | |
|---|---|---|---|
| 4,505,826 A | 3/1985 | Horton | 252/8.55 R |
| 4,683,954 A | 8/1987 | Walker et al. | 166/307 |
| 4,797,216 A | 1/1989 | Hodge | 252/8.551 |
| 4,959,464 A | * 9/1990 | Yeh | 536/121 |
| 5,207,934 A | 5/1993 | Dovan et al. | 252/8.551 |
| 5,335,733 A | 8/1994 | Sandiford et al. | 166/300 |
| 5,372,732 A | * 12/1994 | Harris et al. | 507/211 |
| 5,421,411 A | 6/1995 | Sydansk | 166/295 |
| 5,439,057 A | 8/1995 | Weaver et al. | 166/295 |
| 5,486,312 A | 1/1996 | Sandiford et al. | 252/315.1 |
| 5,532,350 A | 7/1996 | Cottrell et al. | 536/76 |
| 5,547,025 A | 8/1996 | Ahmed et al. | 166/295 |
| 5,617,920 A | 4/1997 | Dovan et al. | 166/295 |
| 5,642,783 A | 7/1997 | Moradi-Araghi et al. | 166/295 |
| 5,979,557 A | 11/1999 | Card et al. | 166/300 |
| 5,981,447 A | 11/1999 | Chang et al. | 507/271 |

* cited by examiner

Primary Examiner—Philip Tucker
(74) Attorney, Agent, or Firm—Robin C. Nava; Thomas O. Mitchell

(57) ABSTRACT

A chemical system and method to stop or minimize fluid loss during completion of wells penetrating hydrocarbon formations are provided. The inventions relates to formulating a highly stable crosslinked hydroxyethyl cellulose (HEC), control released viscosity reduction additives, and user friendly packaging. The chemical system contains a linear HEC polymer solution, a low solubility compound which slowly raises the fluid pH, a chelating agent which further increases the pH level beyond the equilibrium achievable by the low solubility compound, a metal crosslinker which crosslinks HEC at elevated pH, a crosslink delaying agent which allows fluid viscosity to remain low until the fluid reaches the subterranean formation, and optionally an internal breaker. The chemical additives are packaged as an integrated pallet and transported to a field location which allows operators to conveniently mix them before pumping. There is also provided a dry granulated crosslinked polysaccharide for use as a fluid loss control agent.

20 Claims, 8 Drawing Sheets

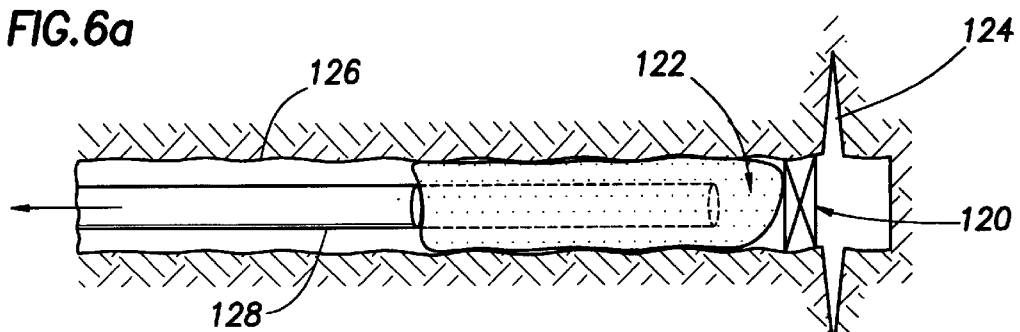
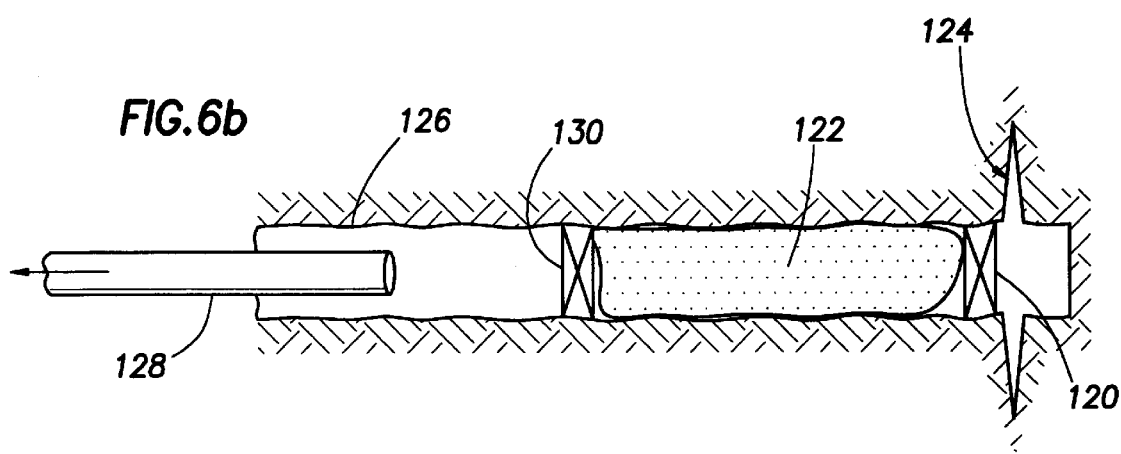
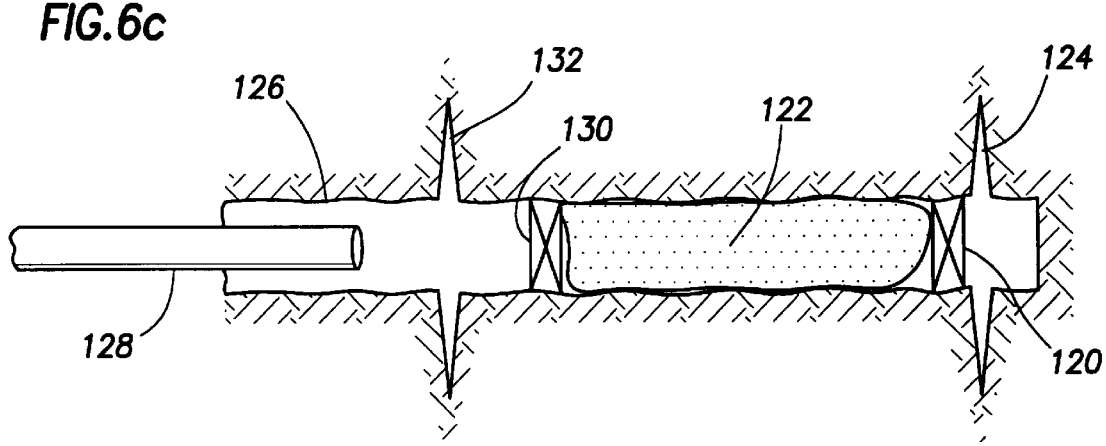

$$\mu_{eff} = \frac{\Delta P \pi D^4}{128 L Q}$$

METHOD AND COMPOSITION FOR CONTROLLING FLUID LOSS IN HIGH PERMEABILITY HYDROCARBON BEARING FORMATIONS

This application is a continuation of prior application Ser. No. 09/324,291, filed Jun. 2, 199, now U.S. Pat. No. 6,165,947 which is a divisional of prior application Ser. No. 08/864,269, filed May 28, 1997, now U.S. Pat. No. 5,981,447.

FIELD OF THE INVENTION

In one aspect, the present invention relates to novel fluid loss control agents for use in drilling, completion and stimulation fluids. More particularly, the present invention relates to the use of a dry crosslinked polymer particulate system to form a filter-cake to reduce treatment fluid loss to permeable formations. In another aspect, the present invention relates to a chemical system for use in providing a crosslinked polymer pill to form a filter-cake to reduce treatment fluid loss to permeable formations, wherein the chemical system is preferably palletized.

BACKGROUND

During the drilling of an oil well, a usually aqueous fluid is injected into the well through the drill pipe and recirculated to the surface in the annular area between the wellbore wall and the drill string. The functions of the drilling fluid include: lubrication of the drill bit, transportation of cuttings to the surface, overbalancing formation pressure to prevent an influx of oil, gas or water into the well, maintenance of hole stability until casings can be set, suspension of solids when the fluid is not being circulated, and minimizing fluid loss into and possible associated damage/instability to the formation through which drilling is taking place.

Proper overbalancing of formation pressure is obtained by establishing fluid density at the desired level usually via the addition of barite. Transportation of cuttings and their suspension when the fluid is not circulating is related to the fluid viscosity and thixotropy which depend on solids content and/or use of a polymer. Fluid loss control is obtained also by the use of clays and/or added polymers.

Fluid properties are constantly monitored during the drilling operations and tailored to accommodate the nature of the formation stratum being encountered at the time. When drilling reaches the producing formation special concern is exercised. Preferentially, low solids content fluids are used to minimize possible productivity loss by solids plugging. Proper fluid density for overbalancing formation pressure may be obtained by using high salt concentration aqueous brines while viscosity and fluid loss control generally are attempted by polymer addition, and/or soluble particulates such as calcium carbonate or size salt in saturated brine solution.

When high permeability and/or poorly consolidated formations are penetrated as the zone of interest, a technique referred to as "under-reaming" often is employed in the drilling operations. In this process, the wellbore is drilled through the hydrocarbon bearing zone using conventional techniques and drilling muds. A casing generally is set in the well bore to a point just above hydrocarbon bearing zone. The hydrocarbon bearing zone then is redrilled using an expandable bit that increases the diameter of the hole. The purpose of the under-reaming is to remove damage from the permeable formation introduced during the initial drilling process by particles of the drilling mud and to increase the exposed surface area of the wellbore. Typically, under-reaming is effected utilizing special "clean" drilling fluids to minimize further formation damage. The high permeability of many hydrocarbon zones allows large quantities of the clean drilling fluid to be lost to the formation. Typical fluids utilized in under-reaming comprise expensive, aqueous, dense brines which are viscosified with a gelled or crosslinked polymer to aid in the removal of the drill cuttings. Such dense brines have been reported as being difficult to unload from formations once losses have occurred. Calcium and zinc-bromide brines can form highly stable, acid-insoluble compounds when reacted with some formation brines. Because of the high density of these brines, stratification tends to further inhibit the removal. The most effective means of preventing this type of formation damage is to limit completion brine losses to the formation.

Providing effective fluid loss control without damaging formation permeability in completion operations has been a prime requirement for an ideal fluid loss-control pill. Conventional fluid loss control pills include oil-soluble resins, calcium carbonate, and graded salt fluid loss additives have been used with varying degrees of fluid loss control. These pills achieve their fluid loss control from the presence of solvent-specific solids that rely on filter-cake build up on the face of the formation to inhibit flow into and through the formation. However, these additive materials can cause severe damage to near-wellbore areas after their application. This damage can significantly reduce production levels if the formation permeabilities is not restored to its original level. Further, at a suitable point in the completion operation, the filter cake must be removed to restore the formation's permeability, preferably to its original level.

A major disadvantage of using these conventional fluid loss additives is the long periods of clean up required after their use. Fluid circulation, which in some cases may not be achieved, is often required to provide a high driving force, which allows diffusion to take place to help dissolve the concentrated build up of materials. Graded salt particulates can be removed by circulating unsaturated salt brine to dissolve the particles. In the case of a gravel pack operation, if this occurs before gravel packing, the circulating fluid often causes sloughing of the formation into the wellbore and yet further loss of fluids to the formation. If removal is attempted after the gravel pack, the gravel packing material often traps the particles against the formation and make removal much more difficult. Other particulates, such as the carbonates can be removed with circulation of acid, however, the same problems may arise. Oil-soluble resins, carbonate and graded salt particulate will remain isolated in the pores of the formation unless they are in contact with solvent. In the cases where the solid material cover a long section of wellbore, the rapid dissolution by solvent causes localized removal. Consequently, a thief zone forms and the majority of the solvent leaks through the thief zone instead of spreading over the entire wellbore length.

The use of conventional gel pills such as linear viscoelastic or heavy metal-crosslinked polymers in controlling fluid loss requires pumping the material through large-diameter tubing because of high friction pressures. These materials are typically prepared at the well site.

Among the linear polymers used to form fluid loss control pills is hydroxyethylcellulose (HEC). HEC is generally accepted as a polymer fluid affording minimal permeability damage during completion operations. Normally, HEC polymer solutions do not form rigid gels, but control fluid loss by a viscosity-regulated mechanism. Such polymer fluids may penetrate deeper into the formation than crosslinked polymers. Permeability damage may increase with increasing penetration of such viscous fluids.

According to conventional wisdom, in high permeability reservoirs, a highly crosslinked gel is needed to achieve good fluid loss control. Though HEC is known for its low residue content, it is difficult to crosslink particularly in regards to on-site or in situ formulations. However, according to M. E. Blauch et al. in SPE 19752, "Fluid Loss Control Using Crosslinkable HEC in High-Permeability Offshore Flexure Trend Completions," pages 465–476 (1989), while there are chemical methods to crosslink standard HEC, these methods have generally been found to be inapplicable to most completion practices.

Therefore, much effort has been expended to modify HEC to make it more easily crosslinkable, which adds to the expense and in some cases complexity of such systems. U.S. Pat. No. 4,552,215 to Almond et al. discloses a cellulose ether which is chemically modified to incorporate pendant vicinal dehydroxy groups which assume or can assume cis geometry. These modified celluloses can be crosslinked by zirconium (IV) metal ions and are useful for fluid loss control.

In SPE 29525, "A New Environmentally Safe Crosslinked Polymer for Fluid loss Control," pages 743–753 (1995), R. C. Cole et al. disclosed a polymer which has been prepared by grafting crosslinkable sites onto an HEC backbone. The polymer can be transformed into a rigid, internally crosslinked gel if the pH of the solution is adjusted from acidic to slightly basic through the use of a non-toxic metal oxide crosslinker. No divalent or trivalent metals are associated with the polymer or included in its crosslinking chemistry. The crosslinking is effected by the use of a slowly soluble, non-toxic metal oxide. The resulting crosslink fluid is said to demonstrate shear-thinning and rehealing properties that provide for easy pumping. The rehealed gel is said to provide good fluid loss control upon placement. The polymer is referred to as a double-derivatized HEC (DDHEC). Instead of being a dry polymer in a bag, the DDHEC is a dispersion in an environmentally safe, non-aqueous, low-viscosity carrier fluid. The non-flammable carrier fluid is initially soluble in most brines. Hydration occurs only at specific, highly acidic conditions. At near neutral pH, the DDHEC polymer is dispersed into the mixing brine. When required, the pH is lowered, encouraging hydration to rapidly occur.

In SPE 36676, "Development and Field Application of a New Fluid Loss Control Material," pages 933–941 (1996), P. D. Nguyen et al. disclosed grating crosslinked, derivatized hydroxyethylcellulose (DHEC) into small particulates kept in a brine solution. Details of the chemistry and properties of the ungrated crosslinked DHEC were described in SPE 29525 discussed above. In SPE 36676, crosslinked DHEC was placed in a pressure chamber to which a perforated disk, cylinder or screen was attached to its end. Air was introduced at the other end of the pressure chamber to push the crosslinked material into and through the grating device and shredded. The shredded material is provided as a slurry concentrate and is said to be stable enough to store in this form. The slurry concentrate is then dispersed in a completion fluid.

U.S. Pat. No. 5,372,732 to Harris et al. discloses a dry, granulated, delayed crosslinking agent for use as a blocking gel in a workover operation comprising a borate source and a water-soluble polysaccharide comprising at least one member selected from the group of guar gum, hydroxypropylguar and carboxymethylhydroxypropylguar. The blocking gel forms a relatively impermeable barrier cordoning off the production zone from the area undergoing the workover operation. The crossliking agent is prepared by dissolving one of the water-soluble polysaccharides identified above in an aqueous solution. To the aqueous solution is added a borate source to form a crosslinked polysaccharide. The borate-crosslink polysaccharide is then dried and granulated. The delayed crosslinking agent is admixed with an aqueous gel containing a second-water soluble polysaccharide solution. As is well known in the art, the borate crosslink is a reversible crosslink in that the borate/polymer crosslink at basic pH is in equilibrium with the borate ion and polymer crosslink sites (i.e., cis oriented hydroxyl groups), wherein the borate ion detaches from one site and then reattaches to another or the same site of the same or different polymer. Such crosslinked polymers are said to be self-healing since if the crosslink is broken it will reform at the same or different location. However, it is also known that HEC is not crosslinkable with borates. This is one reason why HEC has been derivatized by others to incorporate hydroxyl groups which can be in a cis orientation relative to one another.

Thus, there is a need to be able to use unmodified HEC in fluid loss control situations to thereby avoid the cost associated with derivatizing HEC for use in such systems. There is also a need to reduce the complexity of such systems for ease of use at a field site, preferably without the use of a chemist to prepare the fluid loss control pill composition. Further, there is also a need for a reliable viscous fluid loss control system containing no conventional fluid loss control solids.

SUMMARY OF THE INVENTION

In one aspect of the invention, there is provided a dry crosslinked polymer particulate system which can be quickly spotted into a wellbore to control fluid loss. The dry crosslinked polymer particulate system may be used as a fluid loss control agent, for example, during drilling, completion, workover and stimulation operations. Examples of stimulation operations include hydraulic fracturing, fracture acidizing and matrix acidizing. The material is easily mixed and pumped on location. The particulate system bridges the formation face and rehydrate in situ to form a filter-cake. The particulate system is prepared by first making a batch of crosslinked gel, shredding the crosslinked gel into small particles by extrusion, coating the shredded particles with a polymer powder, hardening the coated particles by drying, and then grinding the hardened particles into fine grained material. The polymer to be crosslinked can be guar, derivatized gars, cellulose and derivatized celluloses, e.g., hydroxyethylcellulose and derivatized hydroxyethylcellulose. The crosslinking agents are those that provide zirconium, titanium, aluminum or antimony ions. The crosslinked gel can be extruded and shredded through a perforated disk, cylinder or screen and, preferably, tumbled in a polymer powder-filled roller tank. Preferably, the polymer powder is of the same polymer to be crosslinked. The material can be coated with the polymer powder and dried at the same time. The lumped dry particles can then be ground into fine particles or granules having a size of from about 10 to about 200 meshes on the U.S. Sieve Series. The fine particles can be added to a blender tank on location. These particles do not hydrate and thicken the water immediately, hence low friction pressure is observed while pumping. An advantage of this system is that the material behaves as a solid fluid loss control material, such as the often used carbonate pill, but the particles form a tighter network on the face of the rock once they start to hydrate and expand. There is no solid invasion and permanent formation damage like that usually associated with the calcium carbonate pills.

In another aspect of the present invention, a chemical system and method to stop fluid loss during the completion or workover of wells penetrating hydrocarbon formations are also provided. The invention relates to formulating a highly stable crosslinked hydroxy ethyl cellulose (HEC), control released viscosity reduction additives, and, preferably, user friendly packaging. The chemical system contains a linear HEC polymer solution, a low solubility compound which slowly raises the fluid pH, a cheating agent which further increases the pH level beyond the equilibrium level achievable by the low solubility compound, a metal crosslinker which crosslinks HEC at elevated pH, and a crosslinking delaying agent which allows fluid viscosity to remain low until the fluid reaches the subterranean formation. Preferably, the components of the chemical system are packaged as an integrated pallet and transported to the field location which allows an operator to conveniently mix these components before pumping. Transition metal ions such as titanium and zirconium ions are used to crosslink the HEC fluid system. Difficulty in forming stable crosslinks on HEC linear chains has limited its application in the oil field completion as stimulation operations of the past. The titanium crosslinked systems may under certain conditions suffer shear and thermal instability. Therefore, a zirconium compound which yields zirconium ions at pH levels of 8 and greater is a preferred choice as a crosslinking agent. In a preferred embodiment, the crosslinker used in the system is a zirconium compound, the slow pH raising compound is magnesium oxide, the cheating agent is tetrasodium ethylenediaminetetra-acetate ($Na_4$ EDTA), and the crosslinking delaying agent is sodium lactate. As a result, a highly rigid gel is formed by these chemicals. Various oxidizing breakers and catalysts may be applied to produce the most effective viscosity reduction at specific temperatures.

In this aspect of the invention, all the components of the chemical system preferably are premeasured and organized onto a palletized package, which may also contain easy-to-follow mixing instructions so that equipment operating personnel can perform the well treatment without having to have extensive chemical knowledge about the materials. Preferably, an on-site quality control kit is also included.

BRIEF DESCRIPTION OF THE DRAWINGS

FIGS. 6a, 6b and 6c show the sequence of events in pictorial fashion of another application of the crosslinked HEC pill in an open-hole isolation method for multiple fracturing of horizontal wells.

DETAILED DESCRIPTION OF THE INVENTION

Figure 1:
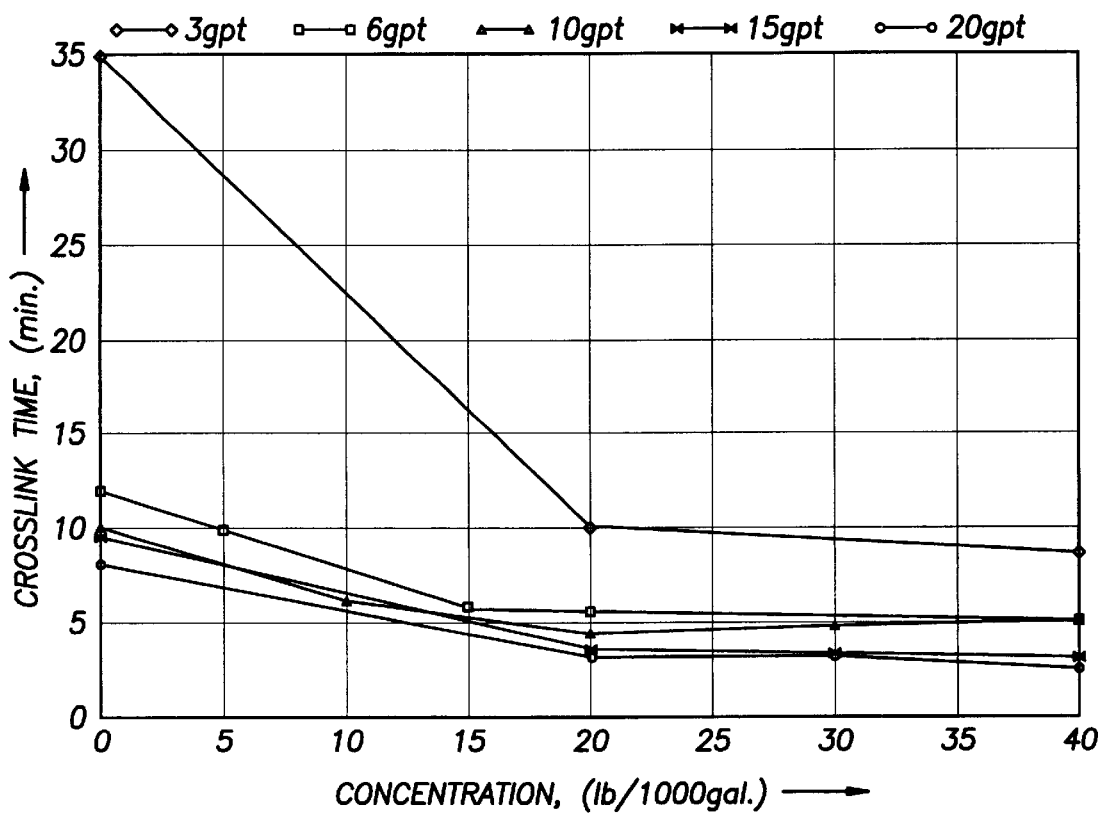
FIG. 1 is a graph showing the effect of $Na_4$ EDTA on the crosslink delay time with different concentrations of magnesium oxide slurry. The magnesium oxide slurry contains 17% by weight of magnesium oxide and 83% by weight of mineral oil.

In one aspect of the present invention, a chemical system and method to stop fluid loss during completion and workover of wells penetrating hydrocarbon formations are provided. The invention relates to formulating a highly stable crosslinked hydroxy ethyl cellulose (HEC), control released viscosity reduction additives, and user friendly packaging. The chemical system contains a linear HEC polymer solution, a low solubility compound which slowly raises the fluid pH, a cheating agent which further increases the pH level beyond the equilibrium level achievable by the low solubility compound, a metal crosslinker which crosslinks HEC at elevated pH, and a crosslinking delaying agent which allows fluid viscosity to remain low until the fluid reaches the subterranean formation. Preferably, the components of the chemical system are packaged as an integrated pallet and transported to the field location which allows an operator to conveniently mix these components before pumping. Transition metal ions such as titanium and zirconium ions are used to crosslink the HEC fluid system. Difficulty in forming stable crosslinks on HEC linear chains has limited its application in the oil field completion and stimulation operations of the past. Under certain conditions, the titanium crosslinked systems may suffer shear and thermal instability. Therefore, a zirconium compound which yields zirconium ions at pH levels of 8 and greater is a preferred choice as a crosslinking agent. In a preferred embodiment, the crosslinker used in the system is a zirconium compound, the slow pH raising compound is magnesium oxide, the cheating agent is EDTA, and the crosslinking delaying agent is sodium lactate. Various oxidizing breakers and catalysts may be applied to produce the most effective viscosity reduction at specific temperatures.

In this aspect of the invention, all the components of the chemical system are preferably premeasured and organized onto a palletized package, which also contains easy-to-follow mixing instructions so that equipment operating personnel can perform the well treatment without having to have extensive chemical knowledge about the materials. Preferably, an on site quality control kit is also included.

The chemical system can be used as a fluid-loss-control pill during completion or workover operations or as a temporary blocking gel for zone isolation. The system is particularly useful in high permeability formations where excessive losses of heavy brines or linear gels are not acceptable. In this aspect of the invention, the system is a delayed, crosslinked-gel system that contains low-residue hydroxyethylcellulose (HEC) polymer, preferably at about 80 to about 120 lbm of HEC per 1000 gallons of carrier fluid to achieve controlled fluid loss. External or internal breakers may be used for clean up. The system is batch-mixed at the wellsite using commonly available mixing equipment.

The system is stable for more than a week at 200° F. (93° C.), and at least 48 hours at 290° F. (143° C.). Fluid stability is controlled by varying the polymer, crosslinker, crosslink activator and, if present, internal breaker concentrations for given temperatures. One or two internal combination breaker systems can be used depending on the temperature. The fluid can also be broken with external breakers such as acid, for example, inorganic acids, such as hydrochloric acid, and organic acids such as formic acid, acetic acid and citric acid. The system crosslinks at pH values greater than 9.5 and the crosslink system rigidity increases with increasing pH. The pH level is preferably about 12.5 to about 13. This preferred pH range produces the most stable and rigid crosslinked gel.

Retained permeabilities in the polymer-invaded region remain high due to the use of low-residue HEC polymer, and the polymer invasion depth is much shallower due to the highly-crosslinked polymer network. The total fluid-loss volume is much lower compared to linear HEC systems because of the crosslink Once the system is broken, there is a rapid response when the well is put back on production, even at low driving pressure.

The system can be used at temperatures ranging from about 80° F. to about 290° F. (about 27° C. to about 140° C.). The system can be used in formations ranging from 0.1 to about 2 darcies.

The system is compatible with KCl, NaCl, NaBr, $CaCl_2$, $CaBr_2$, and $CaCl_2/CaBr_2$ brines. A wide range of brine densities (from about 9 to about 14.8 lbm gallon) can be used. This system is incompatible with $NH_4Cl$, $MgCl_2$ and $ZnBr_2$ brines and seawater. Please note that all $CaBr_2$ and $CaCl_2/CaBr_2$ brines must be free of any $ZnBr_2$. HEC will not hydrate if $CaBr_2$ fluids contain $ZnBr_2$ at 0.5% (wt/wt) or greater. The system works best with KCl, NaCl, and NaBr brines. Therefore, these brines are recommended when the required density permits.

The crosslink delay time can be varied from 0 to about 35 minutes without substantial adverse effects on stability at higher temperatures. Typically, the shorter the delay time, the longer the high-temperature stability. A delayed time of about 10 to about 15 minutes is recommended for most applications. Crosslinking is also temperature-accelerated, which provides flexibility for batch-mixing of all ingredients including the activator at surface temperature.

As noted before, the materials for this system are preferably palletized and shipped as a complete package. The pallet contains enough materials to prepare, for example, 10 barrels of fluid for all applications. Table A lists the pallet materials for a particular embodiment along these lines. The materials in the system are application specific, meaning that not all the materials identified in Table A will be used. A premarked breaker container is preferably included on each pallet and is used to measure the proper amounts of material for specific temperature and permeability applications.

TABLE A

Palletized Material

| Material | Amount |
| --- | --- |
| 15% HCl | 1 each, 1-gallon container |
| Caustic (NaOH) | 100 grams, 1,8-oz container |
| Methanol | 2 each, 5-gallon containers |
| Liquid HEC slurry | 3 each, 5-gallon container |
| Crosslinker (e.g., zirconium lactate) | 1 each, 5-gallon container |
| Delaying Agent (e.g. 60% active sodium lactate) | 1 each, 5-gallon container |
| Magnesium Oxide (e.g., Magchem 20M) | 2 each, 5-lbm bag |
| Magnesium Oxide (e.g., Magchem 10–325) | 2 each, 5-lbm bag |
| Breaker[a] | 1 each, 1-gallon container |
| Breaker Aid | 1 each, 1-gallon container |
| Cheating Agent (e.g., $Na_4EDTA$) | 1 each, 50-lbm bag |

[a]Different oxidizers are used as breakers for different temperature applications. A premarked empty container is preferably included on each pallet. The container should be filled with the appropriate breaker and re-wrapped with the pallet before being transported to the wellsite.

The optimum pH value for HEC hydration is about 8. At pH values less than 8, HEC hydrates slowly. At pH values ranging from 8.2 to 8.5, HEC starts to rapidly hydrate. The system is compatible with a variety of salt types for a wide range of densities. Table B provides the recommended salt type for the fluid density requirement. NaCl or NaBr is recommended when the density requirements is less than 12.3 lbm/gal. $CaCl_2$ or $CaBr_2$ are preferably used when the density requirements is greater than 12.3 lbm per gallon due to cost considerations.

TABLE B

Recommended Brine for Required Density

| Salt | Density (PPG)[a] |
| --- | --- |
| KCl | 85–97 |
| NaCl | 9.4–10 |
| NaBr | 10–12.3 |
| NaCl/NaBr | 10–12 |
| $CaCl_2$ | 10.1–11.5 |
| $CaBr_2$ | 11.5–15 |
| $CaCl_2/CaBr_2$ | 11.7–13.4 |

[a]lbm/gallon.

The HEC concentration in the liquid HEC gelling agent is about 40% by weight. The specific gravity of the liquid HEC slurry is about 0.96. Therefore, to mix 120 lbm per 1000 gallons linear gel requires 36 gallons of liquid HEC slurry. For the liquid HEC gelling agent identified above, Table C provides the volume equivalents of different polymer loadings. One skilled in the art is able to modify Table C for such gelling agents having different HEC concentrations.

TABLE C

HEC SLURRY METERING

| HEC Concentration | Liquid HEC Volumetric Concentration | |
| --- | --- | --- |
| (lbm/1000 gal) | gal/1000 gel | gal/10 bbl |
| 40 | 12 | 5 |
| 60 | 18 | 8 |
| 80 | 24 | 10 |
| 100 | 30 | 13 |
| 120 | 36 | 15 |

The fluids are preferably crosslinked with a zirconium crosslinker, i.e., a crosslinking agent which supplies zirconium ions in solution. Thus, the crosslinking agent can be any convenient source of zirconium ions. A preferred crosslinking additive is a zirconium chelate such as zirconium lactate. Other suitable zirconium compounds include zirconyl chloride, sodium zirconium lactate and zirconium acetylacetonate. The delay agent is preferably the sodium counterpart of these zirconium compounds.

The crosslink can be delayed up to about 35 minutes by adjusting the delay agent concentration and activator concentrations. Magnesium oxide (e.g., Magchem 20M) is recommended for delay times less than 20 minutes. A slower release magnesium oxide with larger particle size (e.g., Magchem 10-325) is recommended for delay times greater than 20 minutes. The recommended activator aid ($Na_4$ EDTA) concentration is at least about 80 lbm. per 1000 gallons, preferably from about 80 to about 120 lbm per 1000 gallons. A preferred quantity is about 100 lbm per 1000 gallons.

Figure 3:
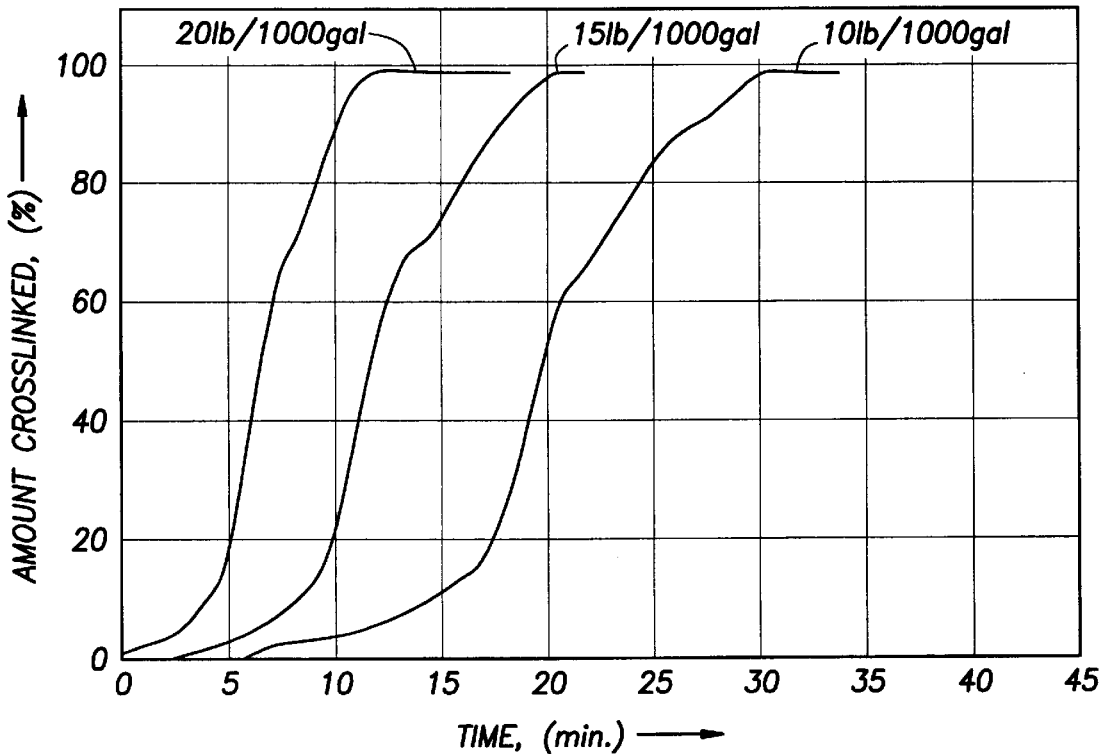
FIG. 3 is a graph showing the effect of magnesium oxide concentration on crosslink delay time.

FIG. 3 shows the effect of magnesium oxide (e.g., Magchem 20M) concentrations on crosslink delay times with a delay agent sodium lactate (60% active) concentration of 15 gallons per 1000 gallons. The magnesium oxide concentrations were 20 lbm/1000 gal., 15 lbm/1000 gal., and 10 lbm/1000 gal. The other components of the composition as added thereto were 2% by volume methanol, 36 gal/1000 gal HEC polymer slurry (40% by weight HEC polymer in the slurry), 12 gal/1000 gal. zirconium lactate and 100 lbm/1000 gal. $Na_4$ EDTA.

Figure 4:
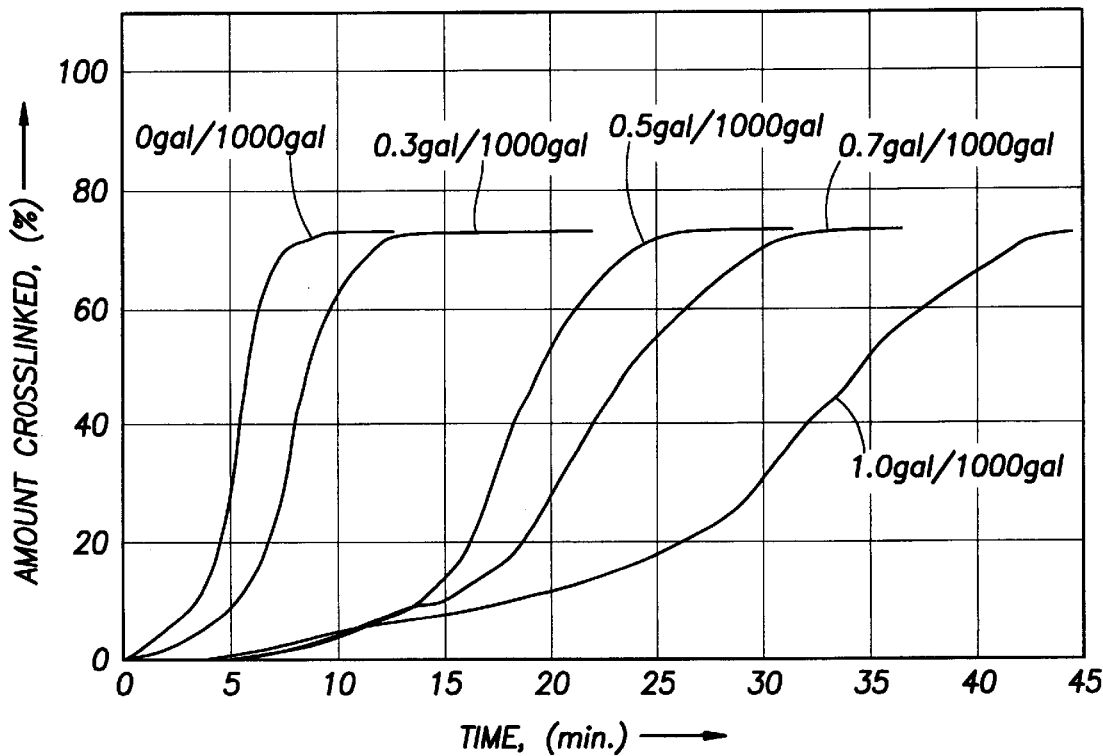
FIG. 4 is a graph showing the effect of delaying agent sodium lactate (60% active) concentration on crosslink delay time when slower releasing magnesium oxide is used.

FIG. 4 shows the effect of the sodium lactate (60% active) concentrations at 0 gal/1000 gal, 0.3 gal/1000 gal, 0.5 gal/1000 gal, 0.7 gal/1000 gal and 1.0 gal/1000 gal at 70° F. (21° C.) with a slower release magnesium oxide (larger particle size; e.g., Magchem 10-325) concentration of 25 lbm per 1000 gallons. The concentrations of KCl, methanol, HEC slurry, zirconium lactate and $Na_4$ EDTA were the same as that used in regards to FIG. 3.

Depending on the reservoir temperature, different types of breakers may be used to reduce the fluid viscosity and to enhance flowback during oil and gas production. Breaker systems and concentrations are designed to reduce the crosslinked fluid viscosity to nearly water viscosity after about 24 hours. If desired, the internal breaker may be omitted, and an inorganic acid (e.g., hydrochloric acid) or organic acid (e.g., formic acid, acetic acid and citric acid) soak used an external breaking mechanism.

Different breakers may be used for different temperature applications. Further, long break times may require using encapsulated breakers in aggressive concentrations at temperatures below 175° F. At 200° F., a catalyst preferably used to activate bromate breakers effectively, if used. For example, at temperatures ranging from about 80° F. to about 125° F. (27° C. to 52° C.), ammonium persulfate is preferred as the internal breaker system. At temperatures ranging from about 125° F. to about 175° F. (52° C. to 79° C.), an encapsulated ammonium persulfate is preferred as the internal breaker. At temperatures ranging from about 175° F. to about 225° F. (79° C. to 107° C.), the preferred internal breaker is sodium bromate used in conjunction with a breaker aid such as copper chloride and ferrous sulfate. Breaker aids lower the activation energy of the breaker, e.g., sodium bromate, in order to effectively operate in this temperature range. At temperatures ranging from about 225° F. to about 250° F. (107° C. to 121° C.), an encapsulated sodium bromate is preferred as the internal breaker. Above 250° F. (121° C.), an internal breaker is not preferred. The encapsulating coating for the encapsulated ammonium persulfate and the encapsulated sodium bromate is preferably a vinylidene chloride/methylacrylate copolymer with an optional coating of talc (magnesium silicate hydrate). The copolymer coating ranges from about 10 to about 30% by weight of the total breaker weight.

Preferred internal breaker concentrations for 24 hour break times are provided in Table D. Laboratory testing is preferably conducted to determine breaker concentrations for other break times.

TABLE D

Fluid-Loss Control Viscous Pill

Recommended Breaker Types and Concentrations
for Different Temperatures
Note: For 24 hours break time.

| Temperature (° F.[° C.]) | Breaker Type and Concentration (lbm/1000 gal [lbm/10 bbl]) | | | | |
|---|---|---|---|---|---|
| | Ammonium Persulfate | Encapsulate Ammonium Persulfate | Sodium Bromate | Copper Chloride or Ferrous Sulfate | Encapsulated Sodium Bromate |
| 75 to 100 (24 to 38) | 15[6] | — | — | — | — |
| 100 to 125 (38 to 52) | 10[4] | — | — | — | — |
| 125 to 135 (52 to 57) | 5[2] | — | — | — | — |
| 135 to 150 (57 to 66) | — | 8[3.5] | — | — | — |
| 150 to 165 (66 to 74) | — | 6[2.5] | — | — | — |
| 165 to 175 (74 to 79) | — | 4[1.5] | — | — | — |
| 175 to 185 (79 to 85) | — | — | 15[6] | 3[1.5] | — |
| 185 to 200 (85 to 93) | — | — | 12[5] | 3[1.5] | — |
| 200 to 225 (93 to 107) | — | — | 10[4] | 3[1.5] | — |
| 225 to 250 (107 to 121) | — | — | — | — | 15[6] |
| >250(>121) | — | — | — | — | — |

The system exhibits excellent fluid-loss control properties and minimal formation damage when used with an internal breaker system because of the leakoff properties of the crosslinked fluids of the present invention and the use of low-residue HEC polymer.

In a preferred embodiment, the pallet contains all of the materials required to mix a ten barrel batch. The system using the chemical components on the pallet may be prepared using the following procedure:
1. Add the mixed-water to a clean mixing tank.
2. Agitate the mixed-water and add the delayed agent (60% active sodium lactate), temperature stabilizer (methanol) and salt. Please note that methanol is a hazardous U waste. The methanol container should be handled using an approved hazardous waste handling procedure.
3. Continue agitation and add the liquid HEC slurry.
4. Continue agitation and add the pH adjusting material, e.g., sodium hydroxide (NaOH), to achieve maximum hydration of the HEC (pH value of 7.5 to 8.0).
5. Mix the linear gel for about 30 minutes.
6. Continue agitation and add the zirconium crosslinker. Mix thoroughly.
7. Immediately before pumping, add the appropriate breaker or breakers (and breaker aid if required) and mix thoroughly.
8. Add the crosslinking activator magnesium oxide, and the activator aid $Na_4$ EDTA, mix thoroughly and begin pumping.

Figure 10:
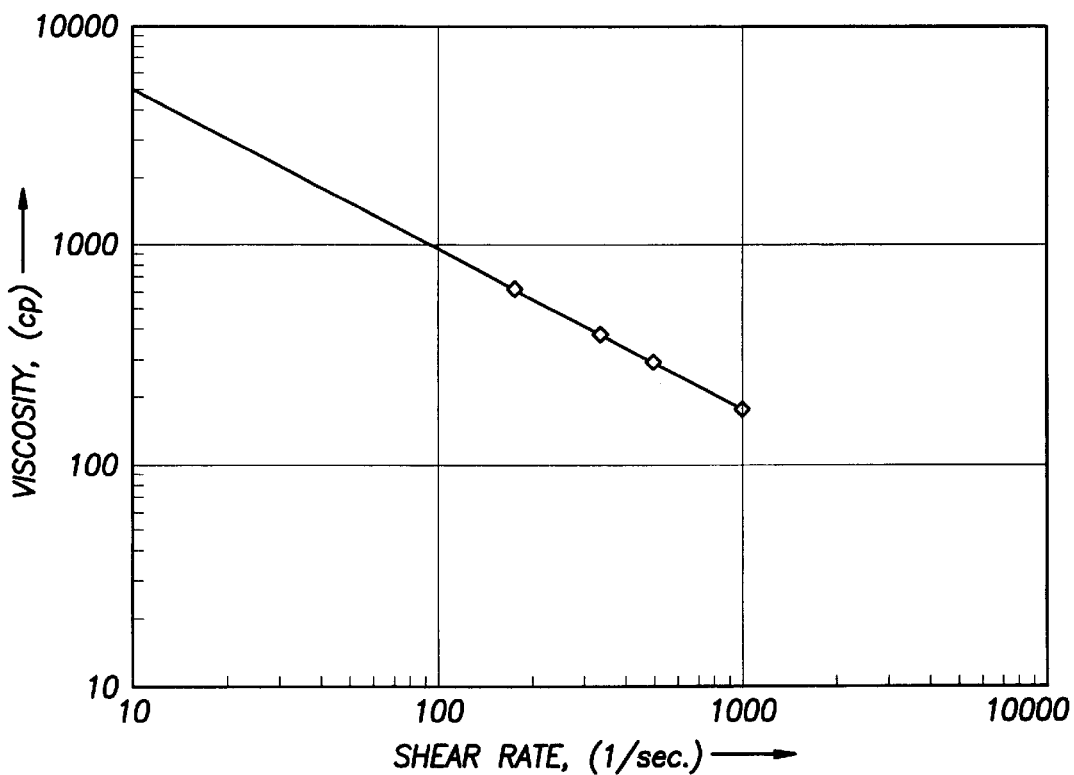
FIG. 10 is a graph of viscosity versus shear rate for crosslinked HEC pill (120 lbm HEC/1000 gallon fluid) at room temperature.

FIG. 10 shows the viscosity of linear HEC at 120 lbm/1000 gallon at 75° F. (24° C.) measured with FANN 35 viscometer. The initial ingredients and concentrations thereof is the fluid composition used for FIG. 10 were 500 ppm sodium bicarbonate, 1.25 ml 15% HCl, 0.047 gm NaOH, 9 ppg KCl, 2% by volume methanol, 36 ml of lignin HEC slurry (40% by weight HEC), 8 ml of zirconium lactate, 219.4 gm KCl and 1000 ml of deionized water. A quality control kit is preferably included with the palletized materials to check the linear gel viscosity before crosslinking and pumping. The quality control kit preferably contains a 60 ml syringe and a 65 mm funnel.

Figure 11:
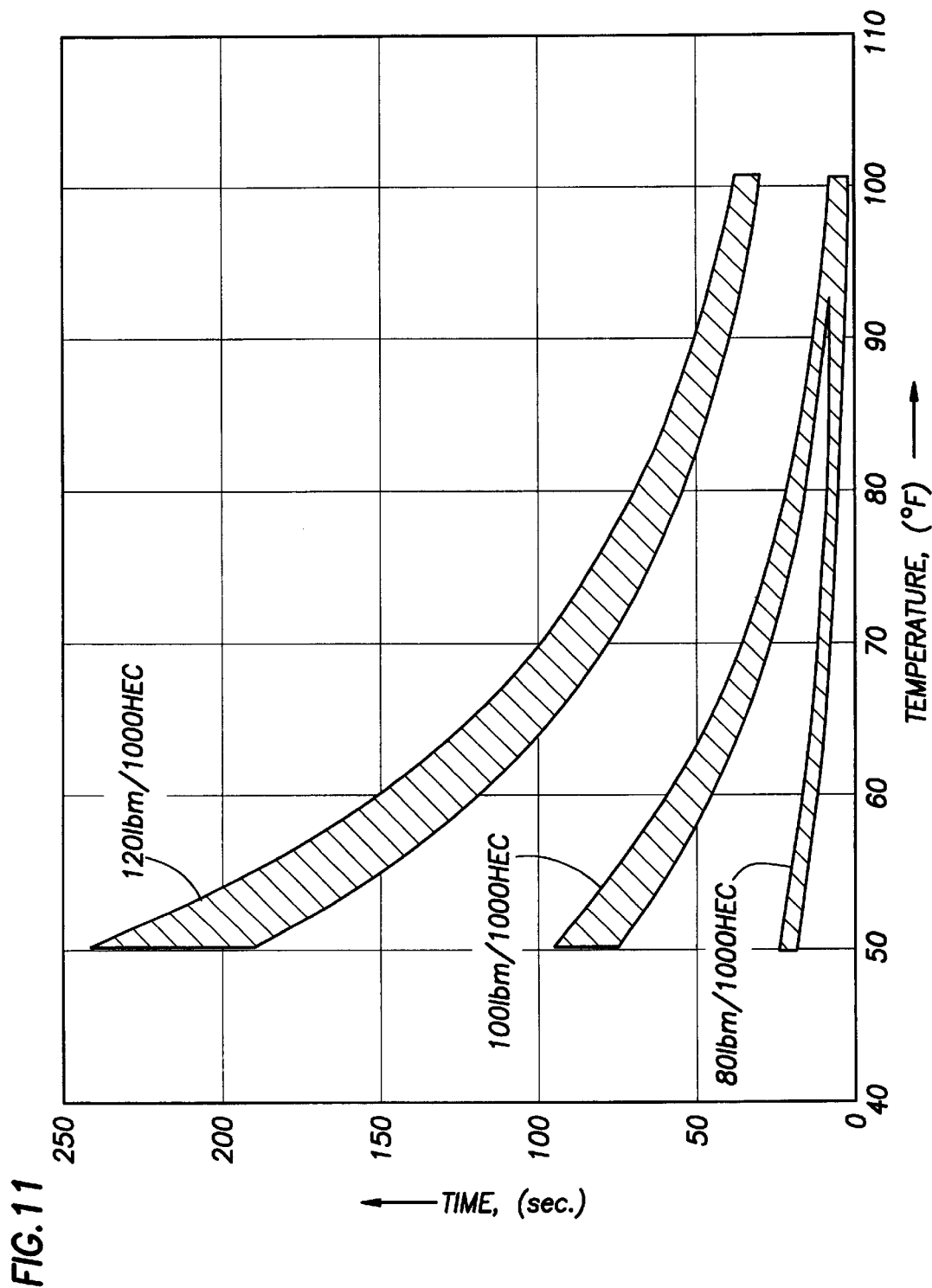
FIG. 11 is a graph of the time required for 50 ml of linear HEC gel to flow through a 65 mm funnel provided in the quality control kit of a palletized chemical system according to the present invention.

After the HEC gel has hydrated for about 30 minutes, extract about 60 ml from the mixed tank and fill the funnel with the outlet of the funnel plugged. Open the funnel plug and the let the gel gravity feed into the empty syringe. Measure the time required to flow 50 ml of gel. Depending on the temperature, the time preferably falls within the ranges provided in FIG. 11.

The breaker schedule given in Table D is designed to reduce the crosslinked gel viscosity to less than 10 cp in about 24 hours. Softening of the crosslinked strength actually begins about 6 hours after the fluid has reached bottom-hole static temperature. The viscosity will slowly decrease to nearly water-like during the 6 to 24 hour time period. The fluid-loss control is provided by the filter-cake formed during the first 6 hours. If desired, the internal breaker may be omitted, and an acid soak (e.g., hydrochloric, formic, acetic or citric acid) soak used as an external breaking mechanism.

The polymer of choice in this aspect of the present invention is hydroxyethyl cellulose (HEC). HEC is referred to as a "clean" polymer in that once the need for the fluid loss control agent is completed and broken, little residue is left on the formation surface. Guar, on the other hand, is regarded as a "dirty" polymer in that significant amounts of residue are left on the formations surface affecting the permeability of the formation, thereby affecting production. Guar is typically used in fracturing operations in that the exposed surface area of the formation is being enlarged or expanded by forcing a fracturing fluid containing guar at elevated pressures sufficient to crack the formation leaving proppants to sustain the openings created by the fracturing operation. Once the fracturing operation is completed, the guar material is broken. In this situation, surface area is much greater and so the residues of guar remaining are not as significant a problem as compared to nonfractured formation faces which have limited surface area exposed to the wellbore via the perforation sites.

In order to form strong crosslinks within the HEC, the system pH must be maintained at or greater than 12 at formation temperature. Though sodium hydroxide or other similar type bases can be used to increase the pH to above 12, once added to the polymer and the crosslinker, the polymer immediately crosslinks, which greatly increased the viscosity of the system making it difficult to pump down the wellbore. Accordingly, a slow dissolving base, for example, magnesium oxide, is used to slowly increase the pH. However, the equilibrium pH for magnesium oxide is a maximum of 10.5 at room temperature. Accordingly, even though additional magnesium oxide is added, the pH will not be raised above this maximum. Other suitable bases include calcium hydroxide and potassium fluoride. Calcium hydroxide is slower than NaOH, but faster than MgO. Potassium fluoride will also slowly increase pH with temperature increase. Further, encapsulated bases may be used to delay the increase in pH until the formation is reached.

Therefore, according to the present invention, a chelating agent is added to tie up the magnesium reducing the concentration of the magnesium ion. This drives the equilibrium of the disassociation of magnesium oxide in water toward producing more magnesium ions and hydroxyl ions. This, in effect, raises the pH to the levels necessary to achieve strong crosslinking of the HEC with the crosslinker, i.e., a pH greater than or equal to 12. At this pH level, the crosslinked HEC can stop, or at least substantially minimize, fluid loss in formations having a permeability up to about 1.8 Darcy.

However, at this stage, there is the interplay of two equilibrium states with the first being the equilibrium of magnesium oxide and water with the magnesium ions and hydroxyl ions, and the second equilibrium condition existing between a chelating agent, e.g., $Na_4$ EDTA plus the magnesium ion to yield a chelate between the magnesium ion and the $EDTA^{4-}$ ion. The chelating agent is preferably in a base form which has a pH of 10.5. In this manner, pH is not decreased as a result of adding the EDTA-containing compound. This chelating mechanism also improves the high temperature stability of the crosslinked gel to about 290° F.

Therefore, the chelating agent is used to help pH increase beyond the equilibrium value that MgO can provide and still maintain the delay. The chelant dissolves in water rapidly and raises the pH to 10.5–11.0. When low MgO concentration is used, the early pH profile will be dominated by the chelant, and the late pH profile will be dominated by the MgO dissolution. However, when high MgO concentration is used, the chelant has minimum effect on the early pH profile of the system, i.e. it will follow the pH profile given by the release of MgO, but the equilibrium pH is much higher. Therefore, the delay mechanism at high MgO concentration is not altered by the chelating agent, and the crosslink strength is dramatically improved.

The mechanism of increasing pH can be described by the following reactions:

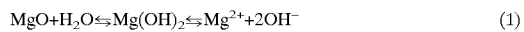

$$MgO + H_2O \leftrightharpoons Mg(OH)_2 \leftrightharpoons Mg^{2+} + 2OH^- \quad (1)$$

$$2Mg^{2+} + EDTA^{4-} \leftrightharpoons Mg_2(EDTA) \quad (2)$$

Since the solubility of $Mg(OH)_2$ is low, when reaction (1) reaches equilibrium, a relatively low concentration of hydroxyl ion (OH⁻) is present in the solution. By forming complexes with magnesium ions, EDTA will drive reaction (1) to the right; a higher pH is therefore achievable. The complexation rate in reaction (2) is faster than the dissociation rate in reaction (1) at a high pH level, so the overall reaction rate is controlled by reaction (1).

Now having the crosslinking of the HEC occurring at the necessary high pH, there is still a need to slow down or delay the crosslinking of the HEC. In a preferred embodiment, the HEC is crosslinked with zirconium ions from a zirconium compound at a pH greater than 12. In order to control the rate of crosslinking, the concentration of the zirconium ion is controlled by use of a delaying agent. For example, if the zirconium compound is zirconium lactate, the zirconium lactate and the zirconium ion and lactate ion exist in equilibrium in the high pH of the system. Accordingly, in the present invention to drive the equilibrium reaction from the ion state to zirconium lactate, the system is manipulated to overload on lactate ions. This reduces the concentration of the zirconium ions thereby slowing or delaying the crosslinking of the HEC by the zirconium ion. A preferred delaying agent in this regard is sodium lactate. The sodium lactate more easily disassociates into sodium ions and lactate ions than zirconium lactate to zirconium ions and lactate ions, thereby overloading the system with lactate ions.

As the SEC slowly crosslinks as a result of any available zirconium ion, the equilibrium reaction between zirconium lactate and its zirconium ion and lactate ion is driven toward the side of producing more zirconium ion. In this manner, the HEC crosslinking is delayed until the appropriate time as it reaches close to or at the location where fluid loss control is needed. The crosslinked HEC forms a filter-cake at these locations effecting fluid loss control.

The crosslinked HEC pill can also be used as a formation sealer during fracturing. For example, in a vertical gas well penetrating two zones of sandstone where only the lower zone is to be hydraulically fractured, the pill serves two purposes: (1) to seal the upper zone while fracturing the lower zone; and (2) to prevent the fluid in the annulus from leaking into the upper zone, so a full column of fluid is maintained in the annulus.

Figure 5:
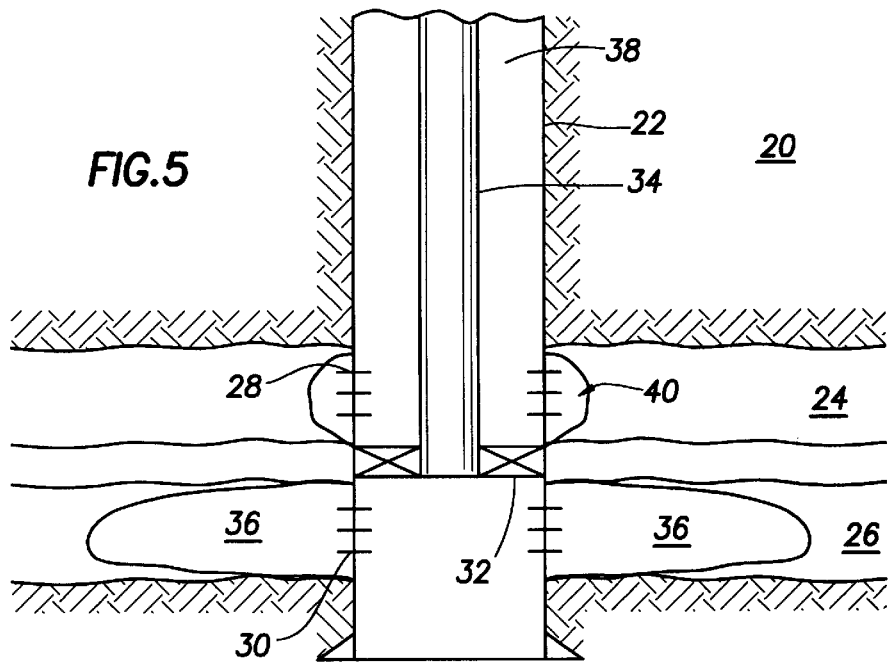
FIG. 5 shows a pictorial view of an application of the crosslinked HEC pill as a formation sealer during fracturing of the formation.

Casing pressure is monitored during the fracturing treatment. If no casing pressure increase is observed, this indicates that the pill functioned as desired or that the fracture failed to extend vertically into the upper zone. Referring now to FIG. 5, there is shown a subterranean formation 20, a casing 22 penetrating an upper zone 24 and a lower zone 26 with corresponding perforations 28 and 30, respectively, through the casing 22. A packer 32 is set to isolate the two zones 24 and 26. The fracture treatment is executed down the tubing 34. The objective is to fracture only the lower zone 26. After the lower zone 26 is fractured, the packer 32 is moved up to above the upper zone 24 to produce both zones 24 and 26 at the same time (not shown). During the fracture operation, the fluid and proppant are confined in the fracture 36. Communication between the annulus 38 and the lower zone 26 around the packer 32 would be undesirable. In order to prevent the fracturing fluid and slurry from entering the annulus 38 above the packer 32, a viscous pill 40 is used to stop the fracture extrusion into the upper zone 24.

The crosslinked HEC pill is pumped down the casing 22 within the annulus 38 and spotted, for example, by a 2% KCl displacement fluid before fracturing is conducted. The pump rate, for example, may be 3 barrels per minute down the annulus 38 between the casing 22 and the tubing 34. When spotting the pill 40, the treatment pressure is low (for example, about 600 psi) due to the delay crosslink mechanism. As a result, no difficulty in pumping is experienced throughout the job. During the fracturing treatment, the casing pressure is monitored to determine if the pill 40 is maintaining the seal relative to the upper zone 24. No casing pressure increase means no communication around the packer 32.

In another aspect of the invention, there is provided a dry crosslinked polymer particulate system which can be quickly spotted into a wellbore to control fluid loss. The material is easily mixed and pumped on location. The particulate system bridges the formation face and rehydrates in situ to form a filter-cake. The particulate system is prepared by first making a batch of crosslinked gel, shredding the crosslinked gel into small particles by extrusion, coating the shredded particles with a polymer powder, hardening the coated particles by drying, and then grinding the hardened particles into fine grained material. In order to prepare the crosslinked gel, an aqueous gel is first prepared by blending a hydratable polymer into an aqueous fluid. The aqueous fluid could be, for example, water, brine or water alcohol mixtures. A number of hydratable polymers are familiar to those in the well service industry. Polysaccharides are hydratable polymers capable of gelling in the presence of a crosslinking agent to form a gelled base fluid. For example, hydratable polysaccharides include the galactomannan gums, guars, derivatized guars, cellulose and cellulose derivatives. Specific examples of galactomannan gums and guars are guar, locust bean gum and caraya gum. Examples of derivatized guar include propylguar and carboxymethylhydroxypropylguar. Examples of derivatized celluloses include alkylcelluloses and mixed ethers. The alkyl group(s) thereof preferably has from 1 to about 3 carbon atoms, for example, methylcellulose, ethylcellulose, hydroxyethylcellulose, hydroxypropylcellulose, carboxymethylcelluose and carboxymethylhydroxyethylcellulose. The crosslinking agents are those that provide zirconium, titanium, aluminum or antimony ions. The crosslinked gel can be extruded and shredded through a perforated disk, cylinder or screen and, preferably, tumbled in a polymer powder-filled roller tank. Preferably, the polymer powder is of the same polymer to be crosslinked. The material can be coated with the polymer powder and dried at the same time. The lumped dry particles can then be ground into fine particles or granules of from about 10 to about 200 meshes on the U.S. Sieve Series. The fine particles can be added to a blender tank on location. These particles do not hydrate and thicken the water immediately, hence low friction pressure is observed while pumping. An advantage of this system is that the material behaves as a solid fluid loss control material, such as the often used carbonate pill, but the particles form a tighter network on the face of the rock once they start to hydrate and expand. There is no solid invasion and permanent formation damage like that usually associated with the calcium carbonate pills. Another advantage of this system is that the slow reaction with breakers allows uniform treatment of a long wellbore interval, in which a thief zone usually forms when acids are used to cleanup the carbonate pill.

In a preferred embodiment, the polymer to be crosslinked is hydroxyethylcellulose (HEC). Since this polymer is going to be pre-crosslinked prior to reaching the wellsite, there is no need to utilize a delay agent or chelating agent as in the previously discussed system. Rather, the crosslinker is added to the hydrated HEC and the pH adjusted by adding, for example, sodium hydroxide. The resulting crosslinked gel can then be extruded through a perforated disk, cylinder or screen and shredded. The gel particles are preferably tumbled in a roller tank filled with a polymer powder, preferably the same polymer that is being crosslinked, in this case HEC. The material can be coated with the polymer powder and dried at the same time. The lump dried particles are then ground into fine particles up from about 10 to about 200 meshes on the U.S. Sieve Series.

In another example, the procedure of U.S. Pat. No. 5,439,057 is modified such that rather than shearing (i.e., extruding and then shredding) the crosslink gel into aqueous fluid directly, the crosslink gel thereof is sheared and tumbled in a polymer powder-filled roller tank, preferably utilizing the polymer being crosslinked as the polymer powder. The material is then dried or can be coated with a polymer powder and dried at the same time. Again, the lump dried particles or granules are then ground into fine particles of about 10 to about 200 meshes on the U.S. Sieve Series. The fine particles can be added to a blender tank on location. U.S. Pat. No. 5,439,057 is hereby incorporated by reference. Please note that the crosslinking agent does not include borates. This invention utilizes the dried crosslinked particles in a similar fashion as solid fluid loss control additives. An advantage of the present invention is that once these particles are in place they swell as a result of being hydrated and more readily seal the formation and minimize fluid loss. Once there is a back flow of the formation up through the wellbore, the filter-cake readily disassociates since the particles thereof are not crosslinked to each other. If a borate crosslinker were used, the filter-cake particles would tend to crosslink with each other due to the rehealing of borate crosslinks and require a breaker system.

In another aspect of the present invention, there is provided a method to enhance the effectiveness of an acidizing treatment. Acidizing is used to either stimulate a well or to remove damage. There are two types of acidizing treatments: (1) matrix acidizing and (2) fracture acidizing with the difference between them relating to injection rates and pressures. Fracture acidizing is acidizing at injection rates above fracture pressure. Fracture acidizing is used for stimulation. Acidizing at injection rates below fracture pressure is termed matrix acidizing. Matrix acidizing is primarily used for damage removal and to restore the permeability to original reservoir permeability or higher. The damage is primarily skin damage caused by drilling, completion and workover fluids and precipitation of deposits from produced water or oil (such as scale). Removal of severe plugging in carbonate and sandstone formations can result in very large increases in well productivity. Oil well flow behavior is greatly affected by the geometry of radial flow into the wellbore. The pressure gradient, for example, psi per foot, is proportional to the flow velocity and is very small at large distances from the wellbore. At points close to the wellbore, the flow area is much smaller and the flowing pressure gradient is much higher. Because of this small flow area, any damage to the formation close to the wellbore, say within 20 feet thereof and sometimes within as little as 3 feet therefrom, may be the cause of most of the total pressure draw down during production and thereby dominate well performance.

A conventional acidizing treatment for a sandstone formation normally will consist of sequentially injecting three fluids—a preflush, a hydrofluoric acid-hydrochloric acid mixture, and an afterflush. For a carbonate formation, a conventional acidizing treatment normally will involve sequential injection of at least two fluids—an acid and an afterflush. A preflush may also be included.

The effectiveness of matrix and fracture acidizing treatments is often dictated by the ability to divert the acid into the areas where it can be most beneficial in opening up pore structures to the production of hydrocarbons. In many cases, acid will increase permeability in a small region. This makes it easier for sequential quantities of acid to follow this same higher permeability "path of least resistance". The dry, granulated fluid loss control agent of the present invention is also useful to temporarily plug off areas most susceptible to fluid movement in order to divert acid away from higher permeability zones. Therefore, the step added to conventional acidizing methods, whether matrix acidizing or fracture acidizing, is the step of providing a dry, granulated fluid loss control agent mixed in a carrier fluid to selectively retard migration of acid into high permeability zones. The steps of adding the fluid loss control agent of the present invention and then of adding the acid can be repeated as necessary during the treatment.

Productivity restrictions caused by oil wetting of formation and fines often can be removed by making the solids water wet. This may be done with surface-active materials provided they contact the solid surface and replace the agent making the surface oil wet. Unfortunately, most surface-active materials alone cannot cause the oil wetting agent to be desorbed. Some chemicals (such as the low molecular weight glycol ethers) can strip the oil wetting surfactant from the surface and leave it water wet. Ethylene glycol monobutyl ether (EGMBE) is often preferred for this application. When used at a concentration of 10 percent by volume in the afterflush, this material is most effective. Low molecular weight alcohols are sometimes used for this purpose, although they appear less effective than the glycol ethers. However, compatibility tests should be performed with acid, formation fluids, and formation solids to assure damage will not occur.

In the acidizing of sandstone formations, the preflush is usually hydrochloric acid, ranging in to concentration from 5 to 15 percent and containing a corrosion inhibitor and other additives as required. The preflush displaces water from the wellbore and formation, i.e., connate, water from the near-wellbore region, thereby minimizing direct contact between sodium and potassium ions in the formation brine and fluosilicate reaction products. Normally, this will eliminate redamaging the formation by precipitation of insoluble sodium or potassium fluosilicates. The acid also reacts with calcite (calcium carbonate) or other calcarious material in the formation, thereby reducing, or eliminating, reaction between the hydrofluoric acid and calcite. The preflush avoids waste of the more expensive hydrofluoric acid and prevents the formation of calcium fluoride, which can precipitate from a spent HF—HCl mixture.

The HF—HCl mixture (usually 3-percent HF and 12-percent HCl) then is injected. The HF reacts with clays, sand, drilling mud or cement filtrate to improve permeability near the wellbore. The HCl will not react and is present to keep the pH low, preventing precipitation of HF reaction products. Because the depth of permeability alteration is severely limited in HF—HCl treatments, a way to extend the action of acid deeper into the formation is to generate the HF acid in situ by injecting methyl formate and ammonium fluoride. Methyl formate hydrolyzes in the presence of formation water to produce formic acid, which then reacts with ammonium fluoride to yield hydrogen fluoride.

The step of providing a dry, granulated fluid loss control agent in a fluid carrier, for example, an aqueous carrier, is added to the conventional acidizing treatment method of sandstone formations either before the preflush step or before the step of adding the acid.

An afterflush is required to isolate the reacted HF from brine that may be used to flush the tubing and to restore water wettability to the formation and the insoluble-acid reaction products. Normally, hydrocarbon producing wells one of two types of afterflush is used (1) for oil wells, either a hydrocarbon afterflush, such as diesel oil, or 15-percent HCl is used and; (2) for gas wells, either acid or a gas (such as nitrogen or natural gas) is used. With a liquid after flush, chemicals usually are added to aid in removing treating fluids from the formation, restoring water wettability to formation solids and precipitated acid reaction products, and prevention of emulsion formation. A glycol ether mutual solvent has been shown to be useful for this purpose. When a gas is used as an afterflush, cleanup additives are added to the HF—HCl stage of the treatment.

In a carbonate matrix acidizing treatment, the acid used (usually hydrochloric acid) is injected at a pressure (and rate) low enough to prevent formation fracturing. If the pressure is above the fracture pressure, the treatment is a fracture acidizing treatment. The goal of the treatments are to achieve more-or-less radial acid penetration into the formation to increase the apparent formation permeability near the wellbore.

The treatment usually involves acid injection followed by a sufficient afterflush of water or hydrocarbon to clear all acid from well tubular goods. A corrosion inhibitor is added to the acid to protect wellbore tubulars. Other additives, such as antisludge agents, iron chelating agents, de-emulsifiers, and mutual solvents, are added as required for a specific formation.

When acid is pumped into a carbonate (limestone or dolomite) formation, the acid flows preferentially into the highest permeability regions (that is, largest pores, vugs or natural fractures). Acid reaction in the high-permeability region causes the formation of large, highly conductive flow channels called wormholes. The creation of wormholes is related to the rate of chemical reaction of the acid with the rock. High reaction rates, as observed between all concentrations of HCl and carbonates, tend to favor wormhole formation. Acids normally used in field treatments are highly reactive at reservoir conditions and tend to form a limited number of wormholes. A low reaction rate favors the formation of several small-diameter wormholes.

The rate of fluid loss from a wormhole often can be reduced with a fluid-loss additive, thereby is increasing wormhole length. Normally, the most effective additives are solids or acids swellable polymers used as acid-fracturing, fluid-loss additives. The dry, granulated fluid loss agent of the present invention initially acts as a solid fluid loss additive and then as a swellable polymer, typically after the particulates of the fluid loss control agent have bridged an area of high permeability. After the particles swell, the bridged particles provide a more effective seal and control the rate of fluid loss from a wormhole.

The productivity increase that can result from a matrix acid treatment in carbonate normally is limited to damage removal. Without a fluid-loss additive, acid penetration distances will be limited to a few feet at most. The maximum stimulation expected from a matrix treatment will be about 1.5-fold above damage removal. The exact stimulation ratio from matrix acidizing of a carbonate cannot be predicted because the number and location of wormholes cannot be predicted. However, by using the dry, granulated fluid loss control agent of the present invention, the number of wormholes is expected to increase or at least the wormhole length attained is greater.

The following are some of the known method of acidizing hydrocarbon bearing formations which can be used as part of the present method: U.S. Pat. No. 3,215,199 to R. E. Dilgren; U.S. Pat. No. 3,297,090 to R. E. Dilgren; U.S. Pat. No. 3,307,630 to R. E. Dilgren et al.; U.S. Pat. No. 2,863,832 to R. L. Perrine; U.S. Pat. No. 2,910,436 to I. Fatt et al.; U.S. Pat. No. 3,251,415 to C. C. Bombardieri; U.S. Pat. No. 3,441,085 to J. L. Gidley; and U.S. Pat. No. 3,451,818 to J. L. Gidley et al., which are hereby incorporated by reference. These methods are modified to incorporate the separate step of providing the dry, granulated fluid loss control agent of the present invention prior to the acidizing step thereof, whether matrix acidizing or fracture acidizing. Again, the steps of adding the fluid loss agent and adding the acid can be repeated as necessary.

EXAMPLES

In the following examples, the following materials are used and/or referenced:

| Description | Purpose |
|---|---|
| methanol | temperature stabilizer |
| 60% sodium lactate | delaying agent |
| liquid HEC polymer | gelling agent |
| 30% NaOH | pH adjusting agent |
| NaOH | pH adjusting agent |
| $Na_4$ (EDTA) | chelating agent |
| zirconium lactate | crosslinker |
| magnesium oxide slurry | crosslinker activator |
| magnesium oxide | crosslinker activator |
| magnesium oxide larger particle size | crosslinker activator |
| sodium bicarbonate | buffer |
| hemicellulase | enzyme breaker |
| alpha amylase | high temperature enzyme breaker |
| polyglycolic acid | breaker |
| encapsulated ammonium persulfate | encapsulated breaker |
| encapsulated calcium peroxide | encapsulated breaker |
| sodium bromate | breaker |
| encapsulated ammonium persulfate | high temperature encapsulated breaker |
| ammonium persulfate | oxidizer |
| surfactant alcohol blend | breaker aid |
| triethanolamine | breaker aid |
| copper (II) chloride dihydrate | breaker aid |

Example 1

Lab Scale Tests

Fluid Mixing and Testing Procedure

1. Preparation of the HEC Linear Gel

A 9 lbm/gal KCl brine was used for most of the samples, although 12.3 lbm/gal NaBr and 9.8 lbm/gal NaCl were also used successfully. The method used to hydrate the linear HEC gel is outlined below:

The required volume of brine was measured. Two percent of temperature stabilizer (methanol) and 1.5% of delaying agent (60% active sodium lactate) by volume were added. Thirty-six gal/1000 gal of liquid HEC polymer (40% by weight HEC) were added to the brine, the equivalent HEC concentration was 120 lbm/1000 gal. A base (30% NaOH) was added drop by drop to adjust the pH of the fluid to about 7.5 to about 8. Rapid hydration could be observed by the closing of the vortex in the blender. The blender was a Waring blender (100 ml cup) with adjustable speed controller. The initial diameter of the vortex was about 1.5 inches. The blender speed was about 1500 to about 2000 rpm. The linear gel was allowed to stand for about 30 minutes to allow complete hydration of HEC polymer.

2. Preparation of the Crosslinked HEC Gel

Several experiments were performed in which the concentrations of crosslinker, activator and chelate were varied in order to produce the strongest possible delayed crosslink gel. Magnesium oxide slurry (17% by weight MgO and 83% by weight mineral oil) concentrations between 0 and 20 gal/1000 gal, and $Na_4$ (EDTA) concentrations between 0 and 100 lbm/1000 gal of fluid were used. Gels with various strengths and crosslink times were produced. The most satisfactory gel in terms of crosslink strength, delay time, and thermal stability contained the following composition:

2% methanol—temperature stabilizer.
1.5% sodium lactate (60% active)—delaying agent.
36 gal/1000 gal HEC polymer slurry (40% by weight)— gelling agent.
0.35 gal/1000 gal 30% NaOH—pH adjusting agent.
12 gal/1000 gal zirconium lactate-crosslinker.
20 gal/1000 gal MgO slurry or 15 lbm/1000 gal to 25 lbm/1000 gal MgO—crosslinker activator.
100 lb/1000 gal $Na_4$ (EDTA)—crosslinker enhance agent.

The above order is also the preferred mixing sequence of preparing the crosslinked HEC pill. However, the order of addition may be varied. When breakers are used, they are preferably added right before the crosslinker.

3. Determination of Crosslink Times

After blending together the gel ingredients for about 20 seconds, the gel was poured out into a jar. At intervals, the jar was tipped slightly so that a small amount of gel was poured out. The jar was then returned to its original position. The time taken for the gel to reach the degree of crosslinking to where the gel returned to the jar after being poured out was called the crosslink or delay time. The strength of the gel was qualitatively observed after it was allowed to fully crosslink, usually between 20 to 30 minutes after it was prepared. When the gel is fully crosslinked, it does not flow even when the jar is positioned upside down.

The crosslink time was also observed by using a Brookfield viscometer connected to a automated chart recorder. A constant rpm was used to measure the steady shear viscosity of the fluid. The Brookfield readings, corresponding to the fluid viscosity, as a function of elapsed time was recorded on the chart recorder. An "S" profile of viscosity development was monitored by the Brookfield viscometer, and the time to the inflection point was defined as crosslink time. The time to reach inflection point of the "S" shape profile corresponds to the previously mentioned "crosslink delay time" determined using the jar technique.

4. Stability Testing

After the crosslinked gel was prepared, it was tested for temperature stability by being placed in 150° F., 200° F., 290° F. and 350° F. ovens over a period of 2 to 7 days, and being observed every 24 hours. The gel was considered to be stable if it remained crosslinked over the required length of time. It was considered unstable if it broke to a water-like consistency or linear gel.

5. Internal Breakers

After a suitable gel formula had been found, experiments were conducted to find suitable internal breakers which would decrease the viscosity of the gel to a value close to that of water in approximately 24 hours. In addition, it was desirable for the gel to remain strong for at least the first 4 hours after reaching the desired temperature. Systems at 150° F. and 200° F. were studied in detail. Several breakers were used in varying concentrations including enzyme breakers such as cellulase, hemi-cellulase and alpha amylase, polyglycolic acid, ammonium persulfate, calcium peroxide, sodium bromate, with breaker aids trimethanolamine, copper chloride dihydrate, and ferrous sulfate. These internal breakers were added to the gel according to the mixing procedure described earlier. After mixing, the gels were allowed to fully crosslink and were then placed in an oven or water bath at the specified temperature. They were then observed every 30–45 minutes for the first 2 hours and then every 1 or 2 hours thereafter for 24 hours. A gel was considered to have broken when by qualitative observation it appeared to have a viscosity similar to that of water.

6. Leakoff Testing

Static fluid loss tests were conducted using leakoff apparatus which consists of 1 inch diameter by 1 inch length core holder, a heat jacket, and a 250 ml fluid reservoir. The tests used 1 inch diameter by ¼ inch length cores. The leakoff testing procedure used is as outlined below:

(1) Two hundred ml of 2% KCl was loaded into a vertical static leakoff cell, with a 1000 md core at the bottom of the cell.

(2) Once the fluid reached temperature, 100 psi drive pressure (no back pressure) was applied and the bottom valve was opened to let KCl flow through the core. The time required to flow 200 ml of 2% KCl was measured.

(3) Two hundred ml of the crosslinked pill was loaded in the cell to heat the pill to the desired temperature.

(4) Drive pressure of 150 psi (no back pressure) was applied to the top of the cell and fluid leakoff from the bottom was measured.

(5) The core was shut in for 24 hours at 150 psi and at the desired temperature.

(6) The bottom valve was opened. The broken fluid and residue were flushed through the core with 150 psi differential pressure.

(7) The time required to flush all the broken gel through the core was measured.

(8) If an external breaker was used, 200 ml of external breaker (about 10% HCl) was loaded into the cell and allowed to soak for 1 hour.

(9) Drive pressure of 100 psi was applied to flush the external breaker through the core.

(10) The cell was refilled w/ 200 ml 2% KCl, step (2) was repeated.

Results and Discussions
HEC System

1. Fluid Chemistry

Figure 2:
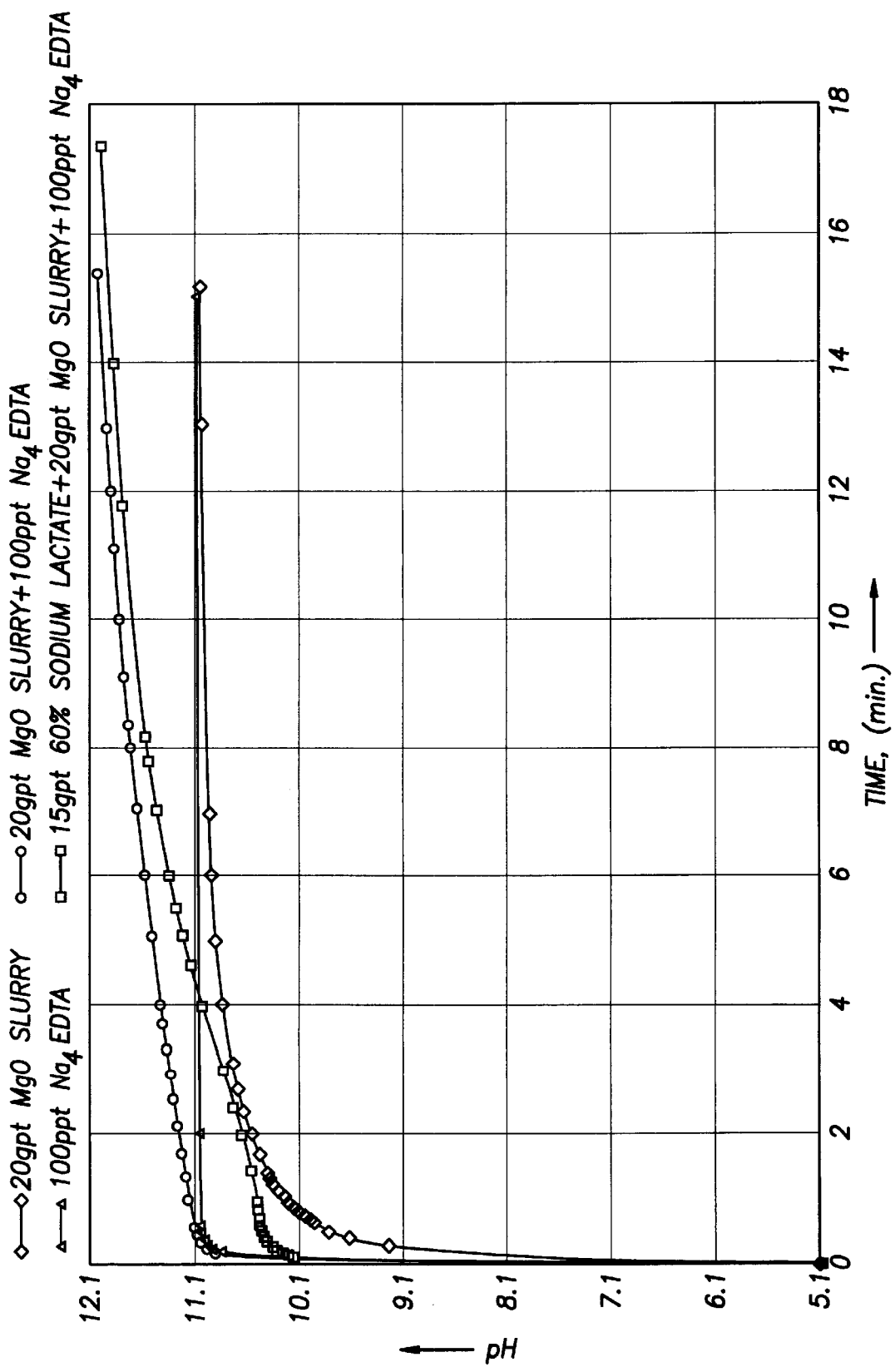
FIG. 2 is a graph showing pH profiles in 9 lbm/gal KCl brine at 72° F. when crosslinker activator, crosslinker enhance agent, and delaying agent are added.

In the preliminary tests, concentrations of magnesium oxide, zirconium crosslinker [zirconium lactate], and chelating agent [$Na_4$ (EDTA)] were varied and the effects on the crosslink delay time were noted. Crosslink times were reduced by high concentrations of either magnesium oxide or $Na_4$ (EDTA). It was observed that at low magnesium oxide slurry concentrations (less than 6 gal/1000 gal), the addition of the chelating agent $Na_4$ (EDTA) had a significant effect on the crosslink time, i.e., reducing the crosslink time greatly. FIG. 1 shows the effect of $Na$, (EDTA) on the crosslink delay time with different concentrations of magnesium oxide slurry (i.e., at 3 gallons/1000 gal (3 gpt), 6 gpt, 10 gpt, 15 gpt and 20 gpt). The fluid otherwise contained 2% methanol, 9 ppg KCl, 36 gpt HEC slurry and 8 gpt zirconium lactate. At high concentrations of magnesium oxide slurry (greater than or equal to 6 gal/1000 gal), the addition of $Na_4$ (EDTA) had a much smaller impact on the crosslink time. This can be explained by the fact that at lower magnesium oxide concentrations, the early pH rise is due to the rapid dissolution of $Na_4$ (EDTA). The pH of 1% tetrasodium EDTA solution is 11. Hence, the addition of tetrasodium EDTA decreases the crosslink time because it rapidly causes the pH of the system to increase to 11 (FIG. 2). At higher magnesium oxide slurry concentrations, both magnesium oxide and tetrasodium EDTA contributed to early pH increase. Therefore, increasing tetrasodium EDTA does not significantly increase the already elevated pH Thus, addition of tetrasodium EDTA has a much smaller impact on the overall rate of pH increase. However, it can be seen from FIG. 2 that when magnesium oxide slowly dissolves and releases $Mg^{2+}$ and $OH^-$, $EDTA^{4-}$ chelates the $Mg^{2+}$ and causes the $Mg(OH)_2$ dissolution reaction to shift to the right, resulting in a higher $OH^-$ ion concentration in the system, and therefore enhances the final strength of the crosslinked gel.

The use of high concentrations of both magnesium oxide and tetrasodium EDTA produced the strongest gel. Thus, 20 gal/1000 gal magnesium oxide slurry (or 15 lbm/1000 to 251 b/1000 gal magnesium oxide) and 100 lbm/1000 gal tetrasodium EDTA are recommended for the optimum gel in terms of strength and thermal stability. This formula was also tried with both 12.3 lbm/gal NaBr and 9.8 lbm/gal NaCl with similar results. The gel made with 12.3 lbm/gal NaBr was stronger and had a longer crosslink delay than the one made with 9 lbm/gal KCl. An alternative crosslinker activator which contains magnesium oxide having a larger particle size (MagChem 10–325 magnesium oxide available from Martin-Marietta) and therefore produces longer crosslink times, can also be used. Although gels made with magnesium oxide are somewhat weaker than those made with the smaller particle size magnesium oxide (MagChem 20M magnesium oxide available from Martin-Marietta), a concentration of 25 lbm/1000 gal of slow-release magnesium oxide produced a gel of almost comparable strength.

The activator and chelant concentrations given above (20 gal/1000 gal magnesium oxide slurry and 100 lbm/1000 gal tetrasodium EDTA) produce a very strong gel with a crosslink time of approximately 6 minutes. To increase the crosslink time, it was discovered that adding 60% active sodium lactate solution resulted in a prolonged crosslink delay. The mechanism by which this delay occurs is unclear, but one possible explanation is as follows. In this embodiment, the crosslinker contains zirconium lactate. The addition of excess lactate ions to the system released from sodium lactate are believed to suppress the release of zirconium ions ($Zr^{4+}$) from the crosslinker and decrease the concentration of zirconium ions in the system available for crosslinking the HEC. However, as $EDTA^{4-}$ ions chelate the $Mg^{2+}$ ions present in the activator, there is an increase in the release of hydroxyl ions ($OH^-$). As the pH of the system increases, crosslinking occurs more rapidly and the concentration of free zirconium ions in the system is further reduced. This eventually overrides the effect of the sodium lactate and causes the crosslinker to release more zirconium ions. As more zirconium ions are released, more crosslink bonds and a stronger crosslinked gel are formed.

Crosslink delay is also affected by temperature. The higher the temperature, the faster the zirconium lactate disassociates, and, therefore, the faster the crosslink reaction occurs. This is why the crosslink said to be is temperature accelerated. Delay times are significantly shorter at 150° F. and 200° F. Thaw at room temperature.

Increasing the sodium lactate concentration causes the crosslink time to increase. However, when present in large concentrations, sodium lactate adversely affects the strength and stability of the crosslinked gel. A 1.5% by volume of the 60% active sodium lactate in 9 lbm/gal KCl produces the optimum results, a crosslink delay of approximately 10 to 12 minutes at room temperature, without seriously affecting the strength of the crosslinked gel. It was also found that the concentration of sodium lactate must sometimes be varied to suit the characteristics of the brine. When 9.8 lbm/gal NaCl was used, it required only 1% of 60% active sodium lactate to produce a similar crosslink delay without affecting the strength of the final gel. The sodium lactate concentration may also be varied to suit the activator; less sodium lactate is needed when the larger particle size magnesium oxide is used. FIGS. 3 and 4 illustrate the achievable crosslink delay time by using various concentrations of delaying agent sodium lactate, various magnesium oxide concentrations, and recommended 25 lbm/1000 gal slow-release magnesium oxide, i.e., larger particle size MgO, concentration. FIG. 3 illustrates the effect of magnesium oxide concentration on crosslink delay time. FIG. 4 illustrates the effect of sodium lactate concentration on crosslink delay time when slow releasing magnesium oxide is used.

The scale of "% crosslinked" is a response from the Brookfield viscometer readings. The Brookfield viscometer measurement procedure was: (1) load 100 ml of fluid in a 4 oz. glass jar, (2) insert the Brookfield RV spindle No. 7 into the center of the fluid, and (3) turn on the motor on the Brookfield viscometer to rotate at 10 rpm, and automatically record the reading as time went on. The rpm and spindle were selected such that the full range (0 to 100) was used during the gel viscosity development to ensure the best resolution. Due to the highly elastic characteristics of the crosslinked gels, the readings obtained from the steady shear measurement may be distorted by slip and normal force. Hence, the recorded Brookfield viscosity magnitude could only serve as an indicator of qualitative viscosity development during crosslinking. The "% crosslinked" is taken as a fraction of the maximum Brookfield viscometer reading reached for the fluid.

Thermal stability tests showed that the gel was stable for 14 days at 150° F. At 200° F., the gel was stable for about a week. At 290° F., the crosslink gel was stable for at least 48 hours. At 350° F., the gel broke to a viscosity approximating water within about 24 hours.

Crosslinked gels which contained excess bicarbonate ions showed no significant difference in terms of thermal stability at 200° F. and 350° F. from those which did not contain excess bicarbonate ions. Further, no significant difference was observed either whether or not the brine was pH treated to expel dissolved carbon dioxide. Because of presence of excess bicarbonate ions did not appear to adversely affect either strength or stability of the final crosslinked gel, it was generally not necessary for the water to be treated by first lowering the pH to 3 to expel carbon dioxide and then raising it back to a pH of 7. However, it was still necessary to adjust the brine pH to between 7 and 8 for the HEC to successfully hydrate.

At 150° F., the encapsulated ammonium persulfate breaker produced th e most satisfactory results. A concentration of 20 lbm/1000 gal was sufficient to break the gel in 24 hours at 150° F. At 200° F., while encapsulated ammonium persulfate could indeed break the gel to a water-like consistency, but it began to break the gel about an hour after being brought up to temperature, quickly making the gel too weak to stop leakoff. Calcium peroxide was found to interfere with the crosslinking process and produced a much softer crosslinked gel. It also left more precipitates once the gel was broken.

Sodium bromate was also tested at 200° F., but it is not effective by itself at temperatures below 250° F. Past research has shown that the addition of small amounts of transition metal compounds, for example compounds of $Fe^{2+}$ and $Cu^{2+}$, catalyzes the reaction between sodium bromate and the crosslinked gel, making sodium bromate effective at lower temperatures. After testing copper, ferrous, cobalt, and nickel ions, it was found that $Cu^{2+}$ compounds appeared to work the best with the crosslinked HEC system. The compounds tested were ferrous sulfate, nickel sulfate, cobalt sulfate and copper (II) chloride dihydrate. A concentration of 3 lbm/1000 gal of breaker aid (copper (II) chloride dihydrate) and 30 lbm/1000 gal sodium bromate produced the best results for a 24 hour break at 200° F. The encapsulated sodium bromate was found to be effective at 250° F.

2. Fluid Loss and Cleanup

The static fluid loss tests were conducted using two similar leakoff cells. The first test apparatus consisted of 1 inch diameter by 1 inch length core holder, a heat jacket, and a 250 ml fluid reservoir. The apparatus is similar to the second test apparatus called an HPHT (High Pressure High Temperature) static leakoff cell, which houses a 2.5 inch diameter by ¼ inch length core. The test results obtained from leakoff cells were compared and rendered comparable results. Table 2 shows the fluid loss and cleanup experiments conducted with the crosslinked pill using 1" diameter by ¼" length cores in the first test apparatus. The core permeability used for all tests was 1000 md. The testing procedure was described in the previous section. It is notable that under a differential pressure of 150 psi per ¼", equivalent to 6000 psi per ft in terms of field units, only trace amounts of filtrate leaked through the disk. The observation means that the gel penetration depth is less than one quarter inch when an overbalance of 6000 psi differential pressure exists, which demonstrated the excellent fluid loss control capability of the crosslinked HEC gel.

Table 2 also shows the regained permeability after the gel is broken by the internal breaker attacked for about 24 hours. Greater than 80% of regained permeability can be obtained using only the internal breakers. The gel can be easily removed by using an external breaker, for example, 10% HCl achieved 100% regained permeability.

The test results obtained from the HPHT apparatus are described in Example 1A.

Dried Crosslinked HEC Particulate

It is often desirable to be able to quickly spot a fluid loss control pill downhole as soon as the formation is perforated and loss of completion fluid occurs. Mixing the pill from scratch may take too much time, therefore a pre-crosslinked particulate system is provided to achieve the rapid mixing and pumping purpose. The material is manufactured in a dry particulate form. These particulates will rehydrate when the particles reach formation, and form a filter-cake on the face of the wellbore. These polymer-based solid particles can be used in a fracturing treatment as fluid loss control additives. The advantage of these particles over insoluble particles commonly used in a fracturing operation is that these polymer-based particles will break to a water-like consistency with minimal residue by breakers commonly used to break fracturing fluids.

The particulate system is produced by first making a batch of crosslinked gel, shredding the crosslinked gel into small particles by extrusion, coating the shredded particles with HEC powder, hardening the coated particles by drying, and then grinding the hardened particles to a fine grained material. The HEC is preferably crosslinked by zirconium, and since no delay is required, NaOH can be used to raise fluid pH and to form strong crosslinked gel. The gel can then be extruded through a perforated pipe and tumbled in a HEC powder-filled roller tank so that the material can be coated with HEC powder and dried at the same time. The lumped dry particles can then be ground to fine particles from 10 to 200, preferably from 60 to 100, meshes on the U.S. Sieve Series.

The fine particles can be added to the blender tank on location. Since they do not hydrate and thicken the water immediately, low friction pressure will be observed while pumping. Once they reach the formation face, the particles start to hydrate and form a filter-cake to prevent fluid loss. The advantage of this approach is that the pill can behave as a solid fluid loss system, such as an often used carbonate pill but the particles form a tighter crosslinked network on the face of the rock once they start to hydrate. Further, there is no solid invasion nor permanent formation damage usually associated with the calcium carbonate pills. Furthermore, the reaction between these particles and external breakers is slower compared to the instantaneous reaction between acid and calcium carbonate. This allows a more uniform removal of the filtercake in long vertical or horizontal intervals, and provides a means for breaker circulation, which is very difficult to achieve with the calcium carbonate system. The system of the present invention has advantages in shelf life and effectiveness on bridging large pore throats when very high permeability or fractured formations are encountered.

TABLE 2

Fluid Loss and Cleanup Tests in 1000 md Ceramic Cores Using the First Test Apparatus
Core Length (Thickness) = 0.25 inch
Core Diameter = 1.00 inch
Core Area = 5.06 cm²
All systems contained internal breakers

| Temperature (° F.) | Initial time (sec) | Cumulative Leakoff Volume (ml/cm²) | | | | Acid soak 1 hour | Regain time (sec) | % regain |
|---|---|---|---|---|---|---|---|---|
| | | 0 min | 1 min | 15 min | 30 min | | | |
| 150 | 10.00 | 0.24 | — | 0.29 | 0.33 | no | 10.87 | 92 |
| 150 | 10.00 | — | — | — | 0.20 | no | 11.38 | 88 |
| 200 | 10.81 | 1.28 | 1.34 | 1.46 | 1.50 | yes | 10.59 | 100 |
| 200 | 15.00 | 0.26 | 0.36 | 0.51 | 0.58 | no | 18.12 | 83 |
| 200 | 10.50 | 0.01 | 0.06 | 0.16 | 0.20 | no | 9.12 | 100 |
| 250 | 12.30 | 0.30 | — | 0.51 | 0.59 | no | | |

Example 1A

Leakoff and Cleanup Performance of Crosslinked HEC Pill Using HPHT Testing Equipment Summary and Remarks The crosslinked HEC viscous pill was lab tested using the second or HPHT leakoff test equipment. Two major performances of the pill were evaluated, first fluid loss control through high permeability formations (>1000 md), and secondly the cleanup of the matrix after leakoff. The tests were conducted at 150° F. and 200° F. Each test consisted of an initial permeability measurement, a fluid loss control measurement, shut-in period, and a regained permeability measurement. External breaker treatment before regained permeability measurement was an optional step.

The tests at both 150° F. and 200° F. showed good results. At 150° F., leakoff through a 1.8 darcy aluminum oxide core was approximately 0.2 ml/cm$^2$. Regained permeability in the range of 80 to 90% relying on internal breakers only was achieved. With an external acid breaker, regained permeability reached 100%. At 200° F., leakoff was 0.29 ml/cm$^2$ through a 800 md berea sandstone core and the regained permeability with only internal breaker was 83%. These test results obtained with the HPHT equipment were comparable to those performed in Example 1 using different equipment, which showed good consistency of the pill of the present invention and repeatability of the tests. Typically, core permeabilities used to test competitor systems were 500 md and lower. Therefore, the crosslinked pill of the present invention passed more stringent conditions.

Pill Composition and Mixing Sequence 9 ppg KCl brine
2% methanol—temperature stabilizer
1.5% sodium lactate (60% active)—delaying agent
0.35 gal/1000 pH adjusting agent (30% NaOH solution)
36 gal/1000 gal liquid HEC (40% by weight HEC) gelling agent
12 gal/1000 gal zirconium crosslinker (zirconium lactate)
20 gal/1000 gal magnesium oxide crosslinker activator (17% MgO and 83% mineral oil)
100 lb/1000 gal tetrasodium EDTA crosslinker enhance agent
Breaker for 150° F.:
25 lbm/1000 gal encapsulated ammonium persulfate breaker
Breaker for 200° F.:
3 lbm/i000 gal copper (II) chloride dihydrate as a breaker activator or aid
30 lbm/1000 gal sodium bromate as a breaker
For every 1000 ml of linear gel:
Add 965 ml of 9 ppg KCl brine
Add 20 ml of methanol
Add 15 ml of sodium lactate (60% active)
Add 36 ml of liquid HEC slurry (40% by weight HEC)
Add 0.35 ml of 30% NaOH solution
Hydrate for 30 minutes
Extract 300 ml of linear gel for crosslinking.
Add breakers
Add 3.6 ml zirconium crosslinker (zirconium lactate)
Add 6 ml magnesium oxide slurry (17% by weight MgO and 83% by weight mineral oil)
Add 3.6 g tetrasodium EDTA Testing Equipment The second or HPHT test leakoff equipment consisted of a 400 ml stainless steel cylinder with a plastic lining. The cell was designed to hold a 2.5 inch diameter core, with ¼ inch thickness at the bottom of the cylindrical cell. The flow chamber had a smaller diameter than the core to avoid fluid flow around the outside edge of the core. A manual on-off valve was located at the bottom of the cell so the effluent would be collected. A pressure port on top of the cell was to connect with a pressure source so differential pressure could be applied. The cell was fitted into a BAROID controllable heat jacket for temperature control.

Description and Discussions

Local tap water was first checked for the effect on pill quality. A 9 ppg (12 %) KCl brine was mixed using field grade KCl and tap water. Two percent methanol and 1.5% sodium lactate (60% active) were added to the brine in the blender and pH was measured to be 6. 120 lbm/1000 gal of liquid HEC was then added to the blender. After being well mixed, 0.35 gal/1000 gal of 30% NaOH was added to raise pH up to about 7.5. Rapid HEC hydration was observed by the closing of the vortex in the blender. The linear gel was then allowed to sit to fully hydrate for 30 minutes. The crosslinker and activators were then added to the linear HEC. A consistent delay time of 12 minutes and crosslinked strength were observed. Therefore, the water source did not affect the chemistry of the pill.

Test 1

A KCl brine saturated aluminum oxide disk (marked FAO-10, 2.5" diameter, ¼" thick) was loaded into the HPHT cell. The mean pore throat diameter of this aluminum oxide core was 43 micron, which translated to about 1.8 darcy in permeability. The cell was then filled with 350 ml of 3% ammonium chloride ($NH_4Cl$), heated to 150° F., and 100 psi drive pressure was applied to the top of the cell. When the temperature of the fluid and the core reached the target temperature (150° F.), the bottom valve was opened and the time required to flush 300 ml of the brine was recorded as an indication of the initial permeability. It took about 5.5 seconds to flush 300 ml of 3% $NH_4Cl$ brine. The remaining brine in the cell was drained out by gravity. The bottom valve was then closed and the cell was filled with 300 ml of the pill. The gel contained an internal breaker of 25 lbm/1000 gal encapsulated ammonium persulfate breaker. The cell was set for 40 minutes to let the gel heat up to temperature. The bottom valve was then opened to collect filtrate for 30 minutes. Table 1A shows the accumulative filtrate volume over 30 minutes. Total leakoff volume was 6.2 mls, equivalent to 0.2 ml/cm2. This result was comparable to the result obtained in Example 1. It is comparable to the reported result for a competitor's system using a 500 ml core, which is only one third of the permeability used in this test. Therefore, the system of the present invention tested favorably under a more stringent condition.

The cell was shut in for 24 hours for the gel to break by the internal breaker. A comparison sample was prepared and set in the water bath to observe the rheology. After 24 hours, the gel in the water bath was seen broken to the consistency of water with minor amount of residue floating on top. The bottom valve of the BPHT cell was opened to push all the broken gel and residue through the core, which is a more stringent test than reversing flow through the core. The cell was then refilled with 3% $NH_4Cl$, heated and flushed through the core with I100 psi drive pressure. The time to flush 300 ml of brine was 20.1 seconds, which translated to be a 27% regain (5.5/20.1). The core was flipped to measure the reversed permeability. The time was 15.37 seconds (36%). These were worse results and inconsistent with the result obtained in Example 1. Therefore, a 15% acid was used to treat the core. After 30 minute acid soak, the flow time was 13.02 seconds (42%). As the pressure inlet was disconnected to clean up the equipment, it was found the pressure port was plugged, so there was a restriction to the nitrogen flow even though the pressure gauge on the regulator showed 100 psi drive pressure. The equipment problem was then resolved and the post acid treatment permeability was re-run. The time to flow 300 ml was only 4.41 seconds. If the ratio of 13.02 to 4.41 seconds was assumed, the regain before acidizing would have been higher by a factor of about 3, which meant 80 to 100%.

Test 2

The second test was run at 200° F. with an 800 md berea sandstone disk. The internal breakers used were 3 lbm/1000 gal copper chloride dihydrate plus 30 lbm/1000 gal sodium bromate. All the other testing parameters were identical to the first test. The initial 3% $NH_4Cl$ flow time was 4.94 seconds. The overall leakoff was 8.9 mls (0.29 ml/cm$^2$). After shutting in for 24 hours, the broken gel was pushed through the core. There was a thick filtercake formed by the residue on the face of the core. Hence, the core was flipped to measure the reversed permeability. The flow time was 5.91 seconds, which is equivalent to 83% cleanup. After opening the cell, it was observed that the filtercake was removed by the hydrodynamic force. This phenomena was also observed while testing in Example 1. No acidizing was required to restore the matrix permeability.

Test 3

The third test was a re-run of the first, so the test was run at 150°F. with another FAO-10 aluminum oxide disk. The internal breaker used was 25 lbm/1000 gal encapsulated ammonium persulfate. The initial 3% $NH_4Cl$ flow time was identical to the first test, 5.5 seconds. After 300 ml of brine was flushed through the core, the remaining 50 ml in the cell was flushed out by 100 psi instead of hydrostatic pressure used in the first test. The purpose was to let air purge the core, and to see if the saturation of the core affected the filtrate volume. The overall leakoff was only 1.5 mls (0.05 ml/cm$^2$). The core was acidize after a 24 hour shut in. The acidizing step was not necessary because of the already effective internal breaker. After shutting in for 24 hours, the broken gel was pushed through the core. Three hundred fifty milliliters (350 ml) of 10% HCl plus 15 lbm/1000 citric acid was poured into the cell and soaked for 1 hour. After flushing acid through the core, the cell was refilled with 350 ml of 3% $NH_4Cl$. The final flow time was 5.08 seconds, which is above 100% regain.

can be easily cleaned up by acid, such that 100% permeability can be restored.

(Prophetic) Example 2

Open-Hole Isolation Method for Multi-frac Horizontal Well

A crosslinked gel is used as an open-hole isolation plug for multi-frac in horizontal wells. The gel plug can be chemically removed by flushing with an acid. FIGS. 6a, 6b and 6c show an embodiment for the frac-plug-frac operation in which the crosslinked gel is used. Step one is to set a low cost retrievable platform, e.g., an inflatable packer 120, at the end of gel plug 122, which is above the first set of fractures 124. This low cost retrievable platform could be an inflatable packer, petal basket, etc. The function of this platform is to serve as a back wall for the gel fluid, so the fluid will not keep flowing along the bottom of the horizontal wellbore 126. This way, a more uniform cylindrical gel plug 122 can form, leaving as little void space in the gel plug as possible after final crosslinked strength is attained. While spotting the gel (see FIG. 6a), the tubing 128 will be pulled slowly so the fluid can evenly fill the wellbore.

Figure 7A:
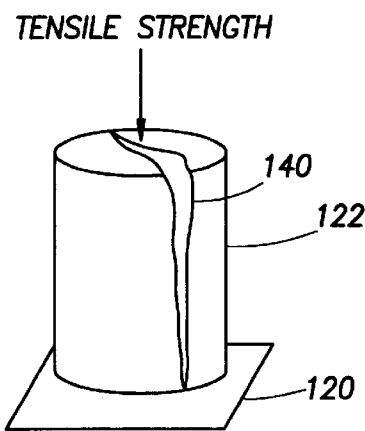
FIGS. 7a and 7b show the stressers on a gel plug by a fracturing fluid as a result of having a single platform (FIG. 7a) or two platforms with the gel plug therebetween (FIG. 7b).
Figure 7B:
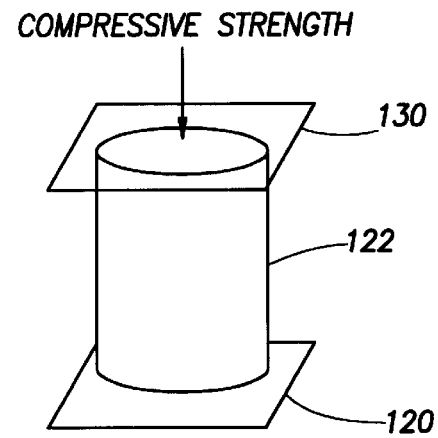

As shown in FIG. 6b, step two is to set a second platform 130 where it will prevent extrusion of the gel when pressure is applied to fracture the next zone. The second platform 130 will also prevent or minimize the splitting of the crosslinked gel by the fracturing pressure. The fracturing pressure creates the second set of fractures 132 as shown in FIG. 6c. The function of this second platform 130 can be viewed as a spacer between the fracturing fluid and the gel plug 122. FIG. 7a illustrates that if the fracturing fluid comes in contact directly with the gel plug 122, it would create a tensile stress and may split the gel plug by tensile failure, then channels 140 may form. FIG. 7b illustrates that the spacer 130 will convert the force applied on the plug 122 and the first platform 120 to compressive stress. Since the compressive strength of the material is much higher than the tensile strength, the risk of plug failure is greatly reduced.

To successfully separate the existing fractures and new target zone, the gel needs to have high viscosity and yield strength to withstand the differential pressure during frac-

| Core | Initial Time (sec) | Cumulative Leakoff Volume (ml) | | | | Regain (sec) | | Regain After Acid (sec) | % regain |
|---|---|---|---|---|---|---|---|---|---|
| | | 0 min | 1 min | 15 min | 30 min | Forward | Reverse | | |
| FAO-10 Aloxide, 1855 md | 5.5 | 2.5 | 3.2 | 5 | 6.2 | 20.1* | 15.4* | 4.41 | 100 |
| Berea Sandstone, 800 md | 4.9 | 2.0 | 4.6 | 7.6 | 8.9 | 42.6 | 5.91 | | 83 |
| FAO-10 Aloxide, 1855 md | 5.5 | 1.1 | 1.2 | 1.4 | 1.5 | | | 5.08 | 100 |

*pressure port was plugged -- see explanation in the description of test 1.

Figure 8:
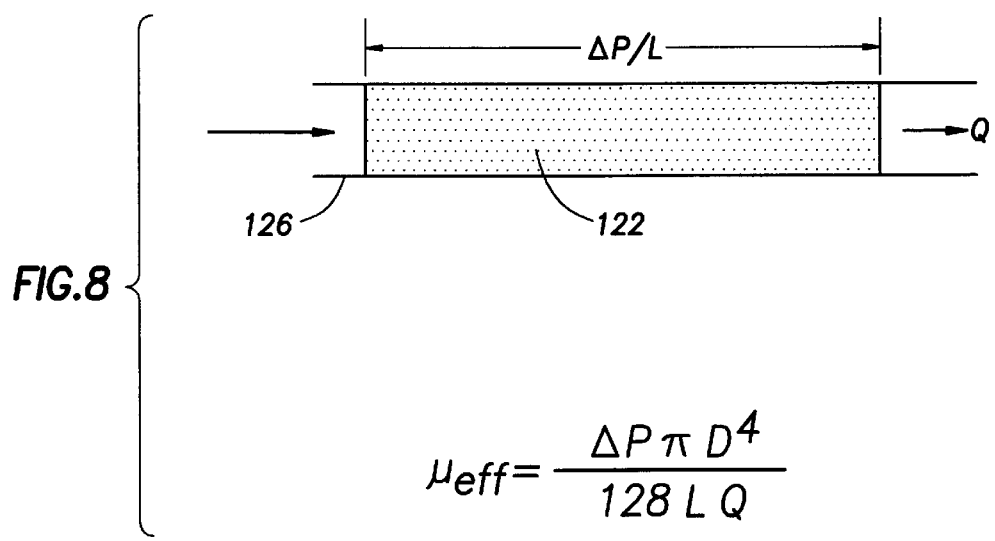
FIG. 8 illustrates viscous fluid flowing in a given diameter wellbore with a given pressure gradient and viscosity calculated using Hagen-Poiseuville equation.
Figure 9:
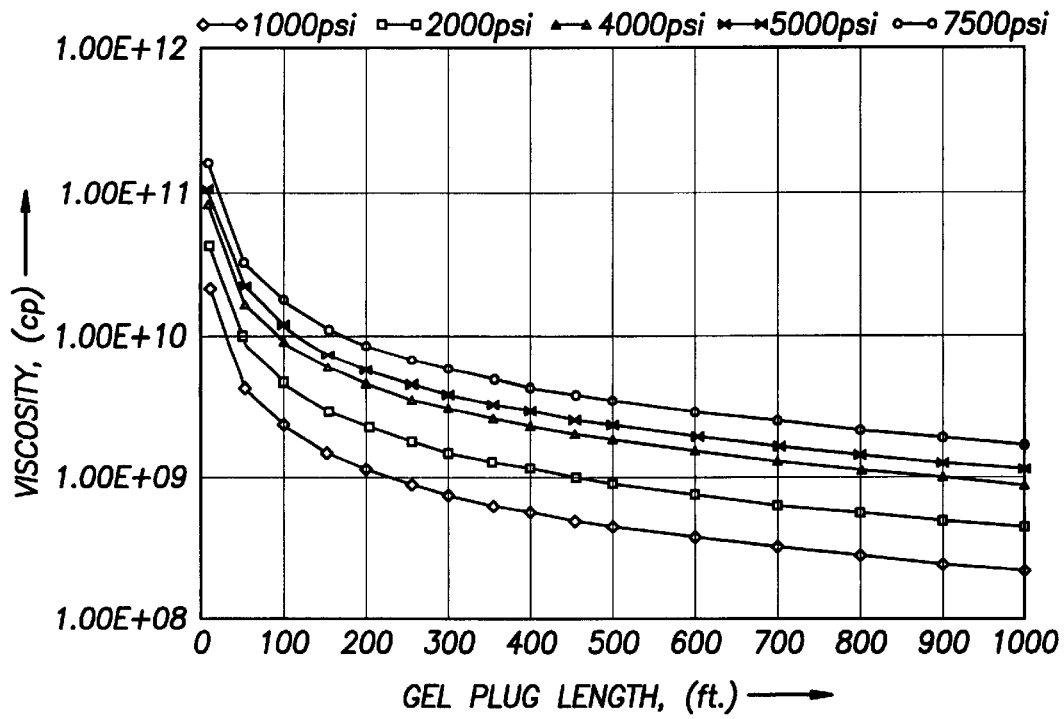
FIG. 9 is a graph of viscosity versus gel plug length in a 4½ inch diameter wellbore at different pressures if only 12 ft/day of plug movement is allowed at different pressures.

The crosslinked HEC pill showed good consistency when mixed with the local water source. The fluid loss control capability through high permeability cores was excellent. According to the testing parameters and results, the gel penetration depth was less than ¼" when subjected to 4800 psi/ft differential pressure. Accordingly, the formation would be undisturbed by the gel. The cleanup efficiency with only internal breaker was above 80 to nearly 100%. The gel turing process. The gel will fill a long section of the wellbore, so that the pressure gradient (psi/ft) can be balanced out by the gel resilience. Therefore, very little to no movement of the gel plug is achieved. To quantify the effective gel viscosity and length requirement, the gel plug is assumed to be a viscous fluid system which can flow under differential pressure in the wellbore after it is set. The equation of fluid flow in a pipe can be used to predict the viscosity requirement for the crosslinked fluid. FIG. 8 illustrates the viscous fluid (i.e., gel plug 122) flowing (Q) in a given diameter (D) wellbore 126 with a given pressure gradient (ΔP), the viscosity requirement ($\mu_{eff}$) can be calculated if very low gel flow rate is allowed by using Hagen-Poiseuille equation. FIG. 9 shows an example of the viscosity requirement versus gel plug length in a 4½ inch diameter wellbore if only 12 ft/day of plug movement is allowed. Note that the viscosity seems to be unreasonably high. However, the crosslinked gel is elastic in nature, rather than being simply a viscous fluid. Therefore, it partially contains the rigidity and yield strength of a solid material. Experiments can be run to convert the crosslinked gel strength to the equivalent apparent viscosity. For example, one such experiment to be carried out in the lab is to fill a pipe or tubing with the crosslinked gel. After the crosslinked gel is set, apply differential pressure until the fluid starts to flow. The flow rate and differential pressure are recorded for effective viscosity calculation. To scale up from the lab testing to the horizontal open-hole, the effective viscosity obtained from the experiment will be used to back calculate the plug length required for operating differential pressure.

The viscous pill is batch fixed so only a mixing tank and a pumping unit is needed. No additional metering equipment is required. The crosslink is delayed by both pH and thermal activation.

Example 3

Elasticity of the Zirconium Crosslinked HEC Fluid

Figure 12:
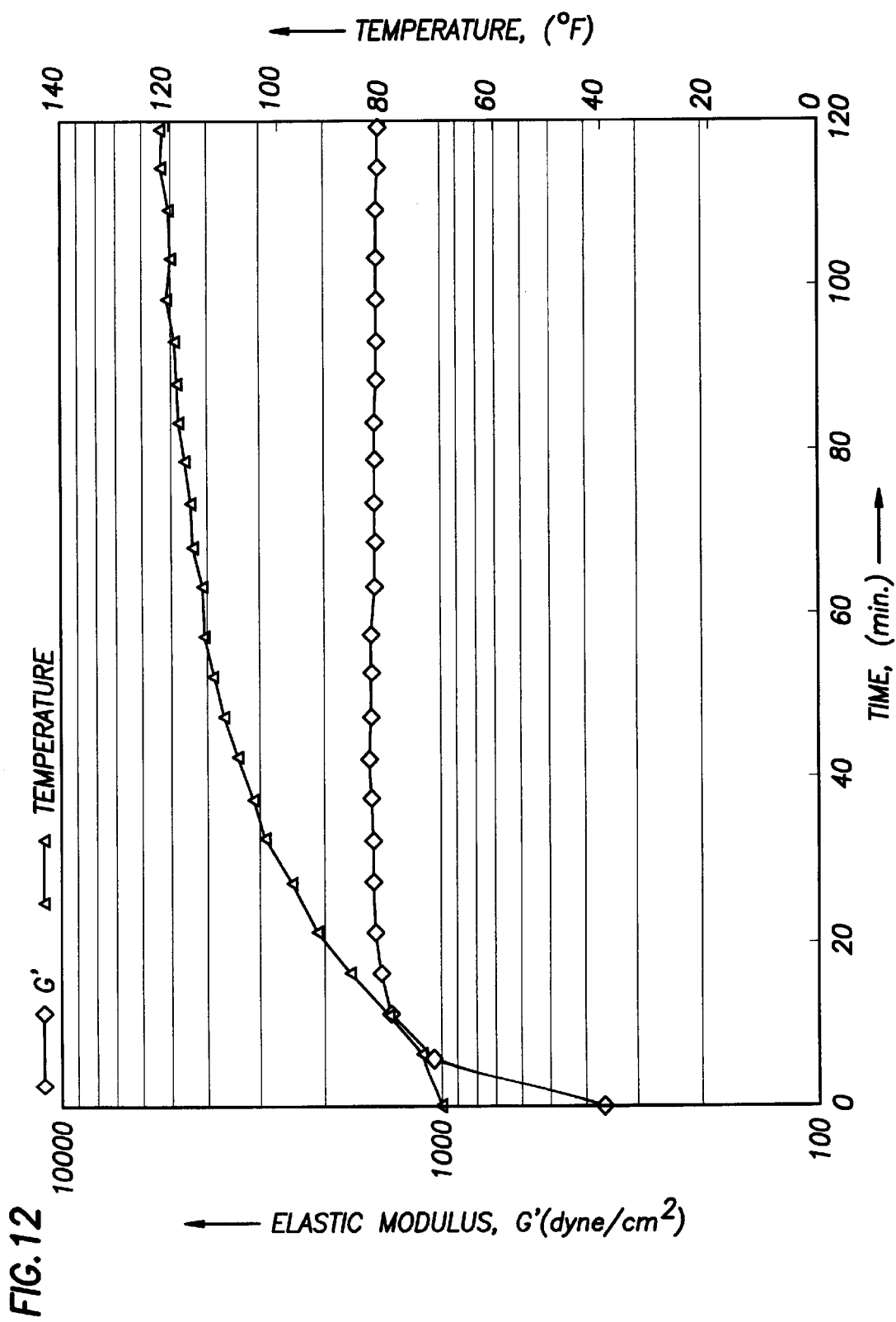
FIG. 12 is a graph of the elastic modulus, $G'(dyne/cm^2)$, and temperature (° F.) versus time, minutes, of a zirconium crosslinked HEC fluid according to the present invention.

In this example, the elasticity of a zirconium crosslinked HEC fluid is measured with a Rheometrics Pressure Rheometer set at 2 radians per second with a 10%/strain. The zirconium crosslinked HEC fluid was prepared using an HEC slurry (40% by weight HEC), 9 lbm of KCl per thousand gallons of fluid, 12 gallons of zirconium lactate (60% active) per thousand gallons of fluid, 20 lbm of magnesium oxide per thousand gallons of fluid and 100 lbm of tetrasodium EDTA per thousand gallons of fluid. The elastic modulus, G'(dyne/cm$^2$) versus time in minutes and the corresponding temperature in degrees Fahrenheit versus time in minutes is shown in FIG. 12.

A crosslinked gel behaves both as an elastic solid and a viscous fluid. The solid-like property can be measured by subjecting the gel to small amplitude oscillatory shear, and characterized by an elastic modulus, G'. The higher the value of G', the more elastic, i.e., more rigid the gel is. A common fracturing fluid containing 40 lbm of hydroxypropylguar (HPG) per thousand gallons of fluid crosslinked with borate exhibits a G' of approximately 25 dyne/cm$^2$ at room temperature and decreases to approximately 10 dyne/cm$^2$ at 149° F. As FIG. 12 shows, the crosslinked HEC gel of the present invention possesses a G' of approximately 1,500 dyne/cm$^2$ at 120° F. This measurement shows the highly elastic, solid-like nature of the fluid system of the present invention.

What is claimed is:

1. A dry crosslinked polymer particulate for use in controlling fluid loss, prepared according to a method comprising:

blending a hydratable polymer that is capable of being crosslinked with an aqueous fluid to produce a blend;

admixing a cross-linking agent capable of releasing at least one ion selected from the group consisting of titanium (IV) ions, zirconium (IV) ions, aluminum (III) ions, and antimony (V) ions with the blend to produce a mixture;

adjusting the pH of the mixture to between about 9.5 and 13 to produce a crosslinked gel;

shredding the crosslinked gel forming a plurality of crosslinked gel fragments;

coating the plurality of crosslinked gel fragments with a polymer powder;

drying the coated crosslinked gel fragments to produce a plurality of coated particles; and grinding the plurality of coated particles to produce a plurality of dry crosslinked polymer particles having a mesh size between about 10 and 200.

2. The dry crosslinked polymer particulate of claim 1, wherein the hydratable polymer is a hydratable polysaccharide.

3. The dry crosslinked polymer particulate of claim 2, wherein the polymer powder comprises the same polymer as the hydratable polymer.

4. The dry crosslinked polymer particulate of claim 1, wherein the hydratable polymer is hydroxyethyl cellulose.

5. The dry crosslinked polymer particulate of claim 4, wherein the pH of the aqueous fluid is adjusted to between about 8 and 8.5.

6. The dry crosslinked polymer particulate of claim 1, wherein the aqueous fluid is water, brine, or a water-alcohol mixture.

7. The dry crosslinked polymer particulate of claim 1, wherein the pH of the mixture is adjusted to between about 12.5 and 13.

8. The dry crosslinked polymer particulate of claim 1, wherein the crosslinked gel is shredded using at least one of a perforated cylinder, a perforated disk, or a screen.

9. The dry crosslinked polymer particulate of claim 1, wherein coating of the gel fragments is performed by tumbling the crosslinked gel fragments in a roller tank with the polymer powder.

10. The dry crosslinked polymer particulate of claim 9, wherein drying and coating are done simultaneously.

11. The dry crosslinked polymer particulate of claim 1, wherein adjusting the pH of the mixture is done using NaOH.

12. The dry crosslinked polymer particulate of claim 1, wherein the dry crosslinked polymer particulate has a mesh size of about 60 to 100.

13. A pumpable composition for use in controlling fluid loss comprising, an aqueous fluid; and a crosslinked polymer particulate coated with a polymer powder;

wherein the crosslinked polymer particulate is prepared according to a method comprising, crosslinking a hydratable polymer with a cross-linking agent capable of releasing at least one ion selected from the group consisting of titanium (IV) ions, zirconium (IV) ions, aluminum (III) ions, and antimony (V) ions with the blend to produce a crosslinked gel;

shredding the crosslinked gel forming a plurality of crosslinked gel fragments;

coating the plurality of crosslinked gel fragments with a polymer powder;

drying the coated crosslinked gel fragments to produce a plurality of coated particles; and grinding the plurality of coated particles to produce a plurality of crosslinked polymer particles.

14. The pumpable composition of claim 13, wherein the crosslinked polymer particles have a mesh size between about 10 and 200.

15. The pumpable composition of claim 13, wherein the hydratable polymer is a hydratable polysaccharide.

16. The pumpable composition of claim 15, wherein the polymer powder comprises the same polymer as the hydratable polymer.

17. The dry crosslinked polymer particulate of claim 1, wherein the hydratable polymer is a polymer selected from the group consisting of galactomannans, celluloses, and derivatized celluloses.

18. The dry crosslinked polymer particulate of claim 1, wherein the hydratable polymer is a polymer selected from the group consisting of guars and derivatized guars.

19. The pumpable composition of claim 13, wherein the hydratable polymer is a polymer selected from the group consisting of galactomannans, celluloses, and derivatized celluloses.

20. The pumpable composition of claim 13, wherein the hydratable polymer is a polymer selected from the group consisting of guars and derivatized guars.

* * * * *